US011799725B2

(12) United States Patent
Kotalwar

(10) Patent No.: US 11,799,725 B2
(45) Date of Patent: Oct. 24, 2023

(54) INTENT-BASED NETWORKING USING RECONSTRUCTION OF INTENTS

(71) Applicant: NOKIA SOLUTIONS AND NETWORKS OY, Espoo (FI)

(72) Inventor: Jayant Kotalwar, Cupertino, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/131,266

(22) Filed: Dec. 22, 2020

(65) Prior Publication Data

US 2022/0200863 A1 Jun. 23, 2022

(51) Int. Cl.
*G06F 15/177* (2006.01)
*H04L 41/08* (2022.01)
*H04L 41/0813* (2022.01)
*H04L 41/0866* (2022.01)
*H04L 41/0893* (2022.01)

(52) U.S. Cl.
CPC ...... *H04L 41/0886* (2013.01); *H04L 41/0813* (2013.01); *H04L 41/0866* (2013.01); *H04L 41/0893* (2013.01)

(58) Field of Classification Search
CPC ............. H04L 41/0886; H04L 41/0813; H04L 41/0866; H04L 41/0893
USPC ........................................................ 709/220
See application file for complete search history.

(56) References Cited

U.S. PATENT DOCUMENTS

| 10,164,829 | B1* | 12/2018 | Watson | ................. H04L 49/252 |
| 2016/0241436 | A1* | 8/2016 | Fourie | ................... H04L 41/122 |
| 2018/0278480 | A1* | 9/2018 | Prasad | ................ H04L 41/0893 |
| 2020/0065166 | A1 | 2/2020 | Myneni | |

(Continued)

FOREIGN PATENT DOCUMENTS

| CN | 111756564 | 10/2020 |
| WO | WO 2018100437 | 6/2018 |

OTHER PUBLICATIONS

3$^{rd}$ Generation Partnership Project, "3$^{rd}$ Generation Partnership Project: Technical Specification Group Services and System Aspects; Telecommunication management; Study on scenarios for Intent driven management services for mobile networks, Release 16," 3GPP TR28.812, V0.4.0, XP51722798A, Mar. 2019, 24 pages.

(Continued)

*Primary Examiner* — Atta Khan
(74) *Attorney, Agent, or Firm* — Tong, Rea, Bentley & Kim, LLC

(57) ABSTRACT

Various example embodiments for supporting intent-based networking within a communication network are presented herein. Various example embodiments for supporting intent-based networking within a communication network may be configured to support a management system configured to support various network deployment scenarios, including greenfield deployment scenarios for enabling customers to deploy and activate new networks, brownfield deployment scenarios for enabling customers to apply intent-based networking to existing networks based on intelligent reconstruction of the original intent(s) of the network and configuration of the network to ensure satisfaction of the original intent(s) of the network, or the like, as well as various combinations thereof.

16 Claims, 12 Drawing Sheets

(56) References Cited

U.S. PATENT DOCUMENTS

2021/0028980 A1* 1/2021 R .................. H04L 41/5009
2021/0377111 A1* 12/2021 Xu ..................... H04L 41/40

OTHER PUBLICATIONS

3$^{rd}$ Generation Partnership Project, "3$^{rd}$ Generation Partnership Project: Technical Specification Group Services and System Aspects; Management and orchestration; Intent driven management services for mobile networks, Release 17," 3GPP TS 28.312, V0.2.0, XP51961766A, Nov. 2020, 14 pages.
Toy, "Technical Report XXX," SG3_030, ITU Draft; Focus Group Net-2030; Series SG3_030, International Telecommunication Union, XP044295405, May 19, 2020, 17 pages.
EP Search Report mailed in corresponding EP Application No. 21207124.5 dated Mar. 30, 2022, 10 pages.
CN Office Action and Search Report mailed in corresponding CN Application No. 202111574710.1 dated May 30, 2023, 11 pages.

\* cited by examiner

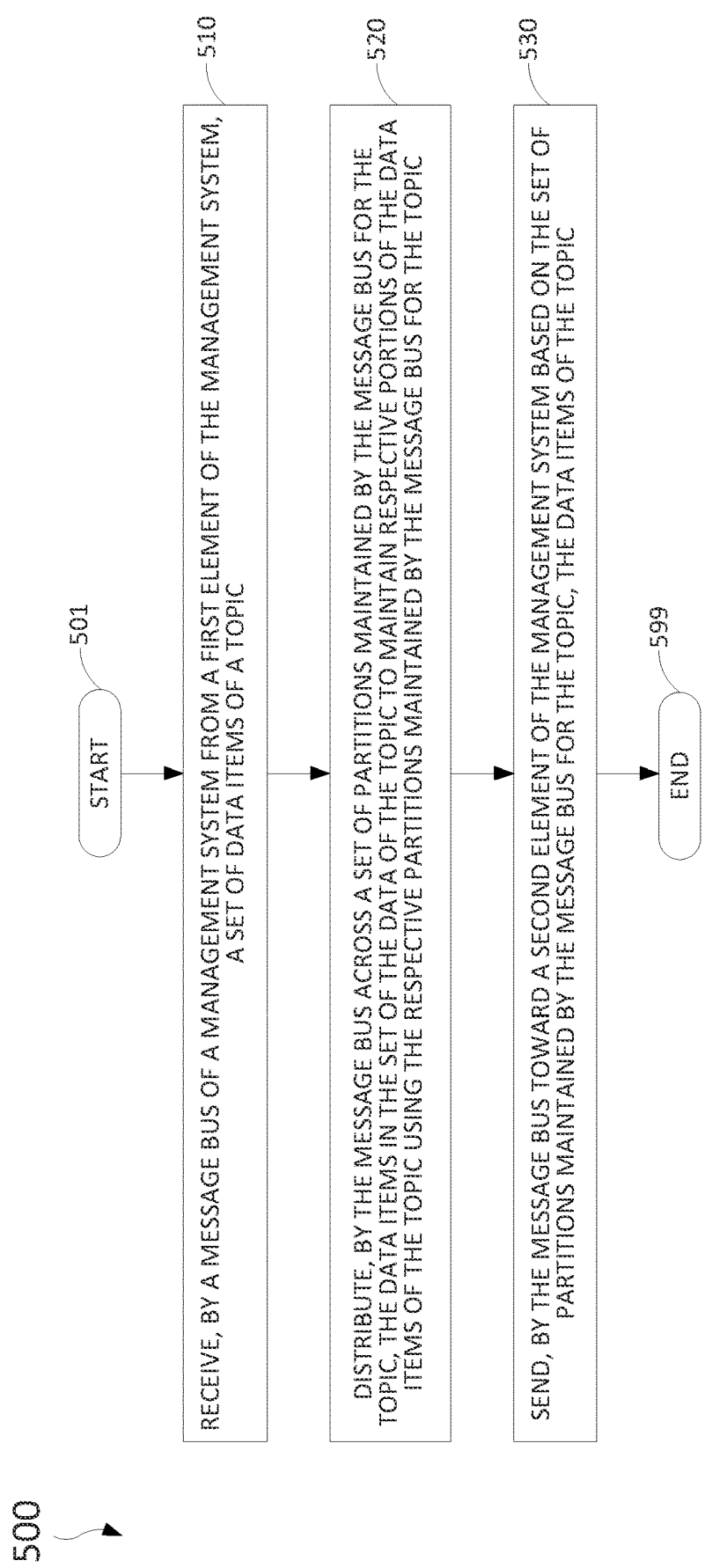

INTENT-BASED NETWORKING USING RECONSTRUCTION OF INTENTS

TECHNICAL FIELD

Various example embodiments relate generally to communication systems and, more particularly but not exclusively, to supporting intent-based networking in various types of communication systems.

BACKGROUND

In many communication networks, various communications technologies may be used to support communications. In at least some communication networks, intent-based networking is being utilized to support improved planning, design, implementation, and management of the communication networks.

SUMMARY

In at least some example embodiments, an apparatus includes at least one processor and at least one memory including a set of instructions, wherein the set of instructions is configured to, when executed by the at least one processor, cause the apparatus to receive a set of network configuration information for a network, determine, based on the set of network configuration information for the network, a network result for the network and a network intent for the network, determine, based on the network result for the network and the network intent for the network, whether the network intent for the network is satisfied by the network, and perform, based on whether the network intent for the network is satisfied by the network, a management action. In at least some example embodiments, the network configuration information for the network includes, for each network element in a set of network elements of the network, at least one of location information for the respective network element or capacity information for the respective network element. In at least some example embodiments, for at least one network element in the set of network elements, the capacity information for the respective network element includes, for each port in a set of ports of the respective network element, a port type of the respective port and a port speed of the respective port. In at least some example embodiments, the network result for the network and the network intent for the network are based on at least one of a location parameter or a capacity parameter. In at least some example embodiments, the network result for the network is determined based on the network intent for the network. In at least some example embodiments, to determine the network intent for the network, the set of instructions is configured to, when executed by the at least one processor, cause the apparatus to determine, based on the set of network configuration information, a network intent type of the network intent, determine, based on the network intent type of the network intent, a set of network intent parameters for the network intent, and determine, for each of the network intent parameters in the set of network intent parameters based on the set of network configuration information, a respective potential value of the network intent parameter capable of being supported by the network. In at least some example embodiments, to determine the network result for the network, the set of instructions is configured to, when executed by the at least one processor, cause the apparatus to determine, for each of the network intent parameters in the set of network intent parameters based on the set of network configuration information, a respective actual value of the network intent parameter currently being supported by the network. In at least some example embodiments, to determine whether the network intent for the network is satisfied by the network, the set of instructions is configured to, when executed by the at least one processor, cause the apparatus to compare, for at least one of the network intent parameters in the set of network intent parameters, the respective potential value of the network intent parameter capable of being supported by the network and the respective actual value of the network intent parameter currently being supported by the network. In at least some example embodiments, the network intent for the network is determined based on the network result for the network. In at least some example embodiments, to determine the network result for the network, the set of instructions is configured to, when executed by the at least one processor, cause the apparatus to determine, based on the set of network configuration information, a set of network parameters for the network and determine, for each of the network parameters in the set of network parameters based on the set of network configuration information, a respective actual value of the network parameter currently being supported by the network. In at least some example embodiments, to determine the network intent for the network, the set of instructions is configured to, when executed by the at least one processor, cause the apparatus to determine, for each of the network parameters in the set of network parameters based on the set of network configuration information, a respective potential value of the network parameter capable of being supported by the network. In at least some example embodiments, to determine whether the network intent for the network is satisfied by the network, the set of instructions is configured to, when executed by the at least one processor, cause the apparatus to compare, for at least one of the network parameters in the set of network parameters, the respective actual value of the network parameter currently being supported by the network and the respective potential value of the network parameter capable of being supported by the network. In at least some example embodiments, to determine whether the network intent for the network is satisfied by the network, the set of instructions is configured to, when executed by the at least one processor, cause the apparatus to compare the network intent for the network and the network result for the network. In at least some example embodiments, the network intent for the network and network result for the network are based on a capacity parameter and, to determine whether the network intent for the network is satisfied by the network, the set of instructions is configured to, when executed by the at least one processor, cause the apparatus to determine whether a difference between a potential value of the capacity parameter for the network intent and an actual value of the capacity parameter for the network result satisfies a threshold. In at least some example embodiments, the management action includes at least one of providing a notification to a customer of the network or reconfiguring the network. In at least some example embodiments, based on a determination that the network intent for the network is satisfied by the network, the management action includes providing a notification to a customer of the network. In at least some example embodiments, based on a determination that the network intent for the network is not satisfied by the network, the management action includes reconfiguring the network. In at least some example embodiments, the reconfiguring of the network is based on a difference between the network intent for the network and the network result for the network.

In at least some example embodiments, a non-transitory computer-readable medium stores a set of instructions configured to cause an apparatus to receive a set of network configuration information for a network, determine, based on the set of network configuration information for the network, a network result for the network and a network intent for the network, determine, based on the network result for the network and the network intent for the network, whether the network intent for the network is satisfied by the network, and perform, based on whether the network intent for the network is satisfied by the network, a management action. In at least some example embodiments, the network configuration information for the network includes, for each network element in a set of network elements of the network, at least one of location information for the respective network element or capacity information for the respective network element. In at least some example embodiments, for at least one network element in the set of network elements, the capacity information for the respective network element includes, for each port in a set of ports of the respective network element, a port type of the respective port and a port speed of the respective port. In at least some example embodiments, the network result for the network and the network intent for the network are based on at least one of a location parameter or a capacity parameter. In at least some example embodiments, the network result for the network is determined based on the network intent for the network. In at least some example embodiments, to determine the network intent for the network, the set of instructions is configured to cause the apparatus to determine, based on the set of network configuration information, a network intent type of the network intent, determine, based on the network intent type of the network intent, a set of network intent parameters for the network intent, and determine, for each of the network intent parameters in the set of network intent parameters based on the set of network configuration information, a respective potential value of the network intent parameter capable of being supported by the network. In at least some example embodiments, to determine the network result for the network, the set of instructions is configured to cause the apparatus to determine, for each of the network intent parameters in the set of network intent parameters based on the set of network configuration information, a respective actual value of the network intent parameter currently being supported by the network. In at least some example embodiments, to determine whether the network intent for the network is satisfied by the network, the set of instructions is configured to cause the apparatus to compare, for at least one of the network intent parameters in the set of network intent parameters, the respective potential value of the network intent parameter capable of being supported by the network and the respective actual value of the network intent parameter currently being supported by the network. In at least some example embodiments, the network intent for the network is determined based on the network result for the network. In at least some example embodiments, to determine the network result for the network, the set of instructions is configured to cause the apparatus to determine, based on the set of network configuration information, a set of network parameters for the network and determine, for each of the network parameters in the set of network parameters based on the set of network configuration information, a respective actual value of the network parameter currently being supported by the network. In at least some example embodiments, to determine the network intent for the network, the set of instructions is configured to cause the apparatus to determine, for each of the network parameters in the set of network parameters based on the set of network configuration information, a respective potential value of the network parameter capable of being supported by the network. In at least some example embodiments, to determine whether the network intent for the network is satisfied by the network, the set of instructions is configured to cause the apparatus to compare, for at least one of the network parameters in the set of network parameters, the respective actual value of the network parameter currently being supported by the network and the respective potential value of the network parameter capable of being supported by the network. In at least some example embodiments, to determine whether the network intent for the network is satisfied by the network, the set of instructions is configured to cause the apparatus to compare the network intent for the network and the network result for the network. In at least some example embodiments, the network intent for the network and network result for the network are based on a capacity parameter and, to determine whether the network intent for the network is satisfied by the network, the set of instructions is configured to cause the apparatus to determine whether a difference between a potential value of the capacity parameter for the network intent and an actual value of the capacity parameter for the network result satisfies a threshold. In at least some example embodiments, the management action includes at least one of providing a notification to a customer of the network or reconfiguring the network. In at least some example embodiments, based on a determination that the network intent for the network is satisfied by the network, the management action includes providing a notification to a customer of the network. In at least some example embodiments, based on a determination that the network intent for the network is not satisfied by the network, the management action includes reconfiguring the network. In at least some example embodiments, the reconfiguring of the network is based on a difference between the network intent for the network and the network result for the network.

In at least some example embodiments, a method includes receiving a set of network configuration information for a network, determining, based on the set of network configuration information for the network, a network result for the network and a network intent for the network, determining, based on the network result for the network and the network intent for the network, whether the network intent for the network is satisfied by the network, and performing, based on whether the network intent for the network is satisfied by the network, a management action. In at least some example embodiments, the network configuration information for the network includes, for each network element in a set of network elements of the network, at least one of location information for the respective network element or capacity information for the respective network element. In at least some example embodiments, for at least one network element in the set of network elements, the capacity information for the respective network element includes, for each port in a set of ports of the respective network element, a port type of the respective port and a port speed of the respective port. In at least some example embodiments, the network result for the network and the network intent for the network are based on at least one of a location parameter or a capacity parameter. In at least some example embodiments, the network result for the network is determined based on the network intent for the network. In at least some example embodiments, determining the network intent for the network includes determining, based on the set of network configuration information, a network intent type of the network intent, determining, based on the network intent type of the network intent, a set of network intent parameters for the network intent, and determining, for each of the network intent parameters in the set of network intent parameters based on the set of network configuration information, a respective potential value of the network intent parameter capable of being supported by the network. In at least some example embodiments, determining the network result for the network includes determining, for each of the network intent parameters in the set of network intent parameters based on the set of network configuration information, a respective actual value of the network intent parameter currently being supported by the network. In at least some example embodiments, determining whether the network intent for the network is satisfied by the network includes comparing, for at least one of the network intent parameters in the set of network intent parameters, the respective potential value of the network intent parameter capable of being supported by the network and the respective actual value of the network intent parameter currently being supported by the network. In at least some example embodiments, the network intent for the network is determined based on the network result for the network. In at least some example embodiments, determining the network result for the network includes determining, based on the set of network configuration information, a set of network parameters for the network and determining, for each of the network parameters in the set of network parameters based on the set of network configuration information, a respective actual value of the network parameter currently being supported by the network. In at least some example embodiments, determining the network intent for the network includes determining, for each of the network parameters in the set of network parameters based on the set of network configuration information, a respective potential value of the network parameter capable of being supported by the network. In at least some example embodiments, determining whether the network intent for the network is satisfied by the network includes comparing, for at least one of the network parameters in the set of network parameters, the respective actual value of the network parameter currently being supported by the network and the respective potential value of the network parameter capable of being supported by the network. In at least some example embodiments, determining whether the network intent for the network is satisfied by the network includes comparing the network intent for the network and the network result for the network. In at least some example embodiments, the network intent for the network and network result for the network are based on a capacity parameter and determining whether the network intent for the network is satisfied by the network includes determining whether a difference between a potential value of the capacity parameter for the network intent and an actual value of the capacity parameter for the network result satisfies a threshold. In at least some example embodiments, the management action includes at least one of providing a notification to a customer of the network or reconfiguring the network. In at least some example embodiments, based on a determination that the network intent for the network is satisfied by the network, the management action includes providing a notification to a customer of the network. In at least some example embodiments, based on a determination that the network intent for the network is not satisfied by the network, the management action includes reconfiguring the network. In at least some example embodiments, the reconfiguring of the network is based on a difference between the network intent for the network and the network result for the network.

In at least some example embodiments, an apparatus includes means for receiving a set of network configuration information for a network, means for determining, based on the set of network configuration information for the network, a network result for the network and a network intent for the network, means for determining, based on the network result for the network and the network intent for the network, whether the network intent for the network is satisfied by the network, and means for performing, based on whether the network intent for the network is satisfied by the network, a management action. In at least some example embodiments, the network configuration information for the network includes, for each network element in a set of network elements of the network, at least one of location information for the respective network element or capacity information for the respective network element. In at least some example embodiments, for at least one network element in the set of network elements, the capacity information for the respective network element includes, for each port in a set of ports of the respective network element, a port type of the respective port and a port speed of the respective port. In at least some example embodiments, the network result for the network and the network intent for the network are based on at least one of a location parameter or a capacity parameter. In at least some example embodiments, the network result for the network is determined based on the network intent for the network. In at least some example embodiments, the means for determining the network intent for the network includes means for determining, based on the set of network configuration information, a network intent type of the network intent, means for determining, based on the network intent type of the network intent, a set of network intent parameters for the network intent, and means for determining, for each of the network intent parameters in the set of network intent parameters based on the set of network configuration information, a respective potential value of the network intent parameter capable of being supported by the network. In at least some example embodiments, the means for determining the network result for the network includes means for determining, for each of the network intent parameters in the set of network intent parameters based on the set of network configuration information, a respective actual value of the network intent parameter currently being supported by the network. In at least some example embodiments, the means for determining whether the network intent for the network is satisfied by the network includes means for comparing, for at least one of the network intent parameters in the set of network intent parameters, the respective potential value of the network intent parameter capable of being supported by the network and the respective actual value of the network intent parameter currently being supported by the network. In at least some example embodiments, the network intent for the network is determined based on the network result for the network. In at least some example embodiments, the means for determining the network result for the network includes means for determining, based on the set of network configuration information, a set of network parameters for the network and means for determining, for each of the network parameters in the set of network parameters based on the set of network configuration information, a respective actual value of the network parameter currently being supported by the network. In at least some example embodiments, the means for determining the network intent for the network includes means for determining, for each of the network parameters in the set of network parameters based on the set of network configuration information, a respective potential value of the network parameter capable of being supported by the network. In at least some example embodiments, the means for determining whether the network intent for the network is satisfied by the network includes means for comparing, for at least one of the network parameters in the set of network parameters, the respective actual value of the network parameter currently being supported by the network and the respective potential value of the network parameter capable of being supported by the network. In at least some example embodiments, the means for determining whether the network intent for the network is satisfied by the network includes means for comparing the network intent for the network and the network result for the network. In at least some example embodiments, the network intent for the network and network result for the network are based on a capacity parameter and the means for determining whether the network intent for the network is satisfied by the network includes means for determining whether a difference between a potential value of the capacity parameter for the network intent and an actual value of the capacity parameter for the network result satisfies a threshold. In at least some example embodiments, the management action includes at least one of providing a notification to a customer of the network or reconfiguring the network. In at least some example embodiments, based on a determination that the network intent for the network is satisfied by the network, the management action includes providing a notification to a customer of the network. In at least some example embodiments, based on a determination that the network intent for the network is not satisfied by the network, the management action includes reconfiguring the network. In at least some example embodiments, the reconfiguring of the network is based on a difference between the network intent for the network and the network result for the network.

BRIEF DESCRIPTION OF THE DRAWINGS

The teachings herein can be readily understood by considering the following detailed description in conjunction with the accompanying drawings, in which:

FIG. 5 depicts an example embodiment of a method for use by a message bus configured to support scalability of a management system configured to support intent-based networking for a communication network;

To facilitate understanding, identical reference numerals have been used herein, wherever possible, in order to designate identical elements that are common among the various figures.

DETAILED DESCRIPTION

Various example embodiments for supporting intent-based networking within a communication network are presented herein. Various example embodiments for supporting intent-based networking within a communication network may be configured to support a management system configured to support management of the communication network based on intent-based networking. Various example embodiments for supporting intent-based networking within a communication network may be configured to support a management system configured to support various network deployment scenarios, including greenfield deployment scenarios for enabling customers to deploy and activate new networks, brownfield deployment scenarios for enabling customers to apply intent-based networking to existing networks based on intelligent reconstruction of the original intent(s) of the network and configuration of the network to ensure satisfaction of the original intent(s) of the network, or the like, as well as various combinations thereof. Various example embodiments for supporting intent-based networking within a communication network may be configured to support a management system configured to support management of a network based on use of scalability for management of the network where the scalability is based on use of partitioning of topics in a publisher-subscriber model used for exchange of information between elements of the management system that support management of the network based on intent-based networking. Various example embodiments for supporting intent-based networking within a communication network may be configured to support management of a network based on use of redundancy for management of the network where the redundancy is based on use of mirroring of message buses associated with instances of the management system, thereby enabling an active message bus to take over handling of data exchanges for a topic previously handled by an unavailable message bus that becomes unavailable to handle data exchanges for the topic. Various example embodiments for supporting intent-based networking within a communication network may be configured to support a management system configured to support management of a network based on use of change management for management of the network where the change management is based on validation of changes in the network before the changes are permanently effected in the network (e.g., based on application of the changes in the network for validation of the changes, based on application of the changes in a network that mirrors the real network before applying the changes to the real network, or the like). It will be appreciated that these and various other example embodiments and advantages or potential advantages of supporting intent-based networking within a communication network may be further understood by way of reference to the various figures, which are discussed further below.

Figure 1:
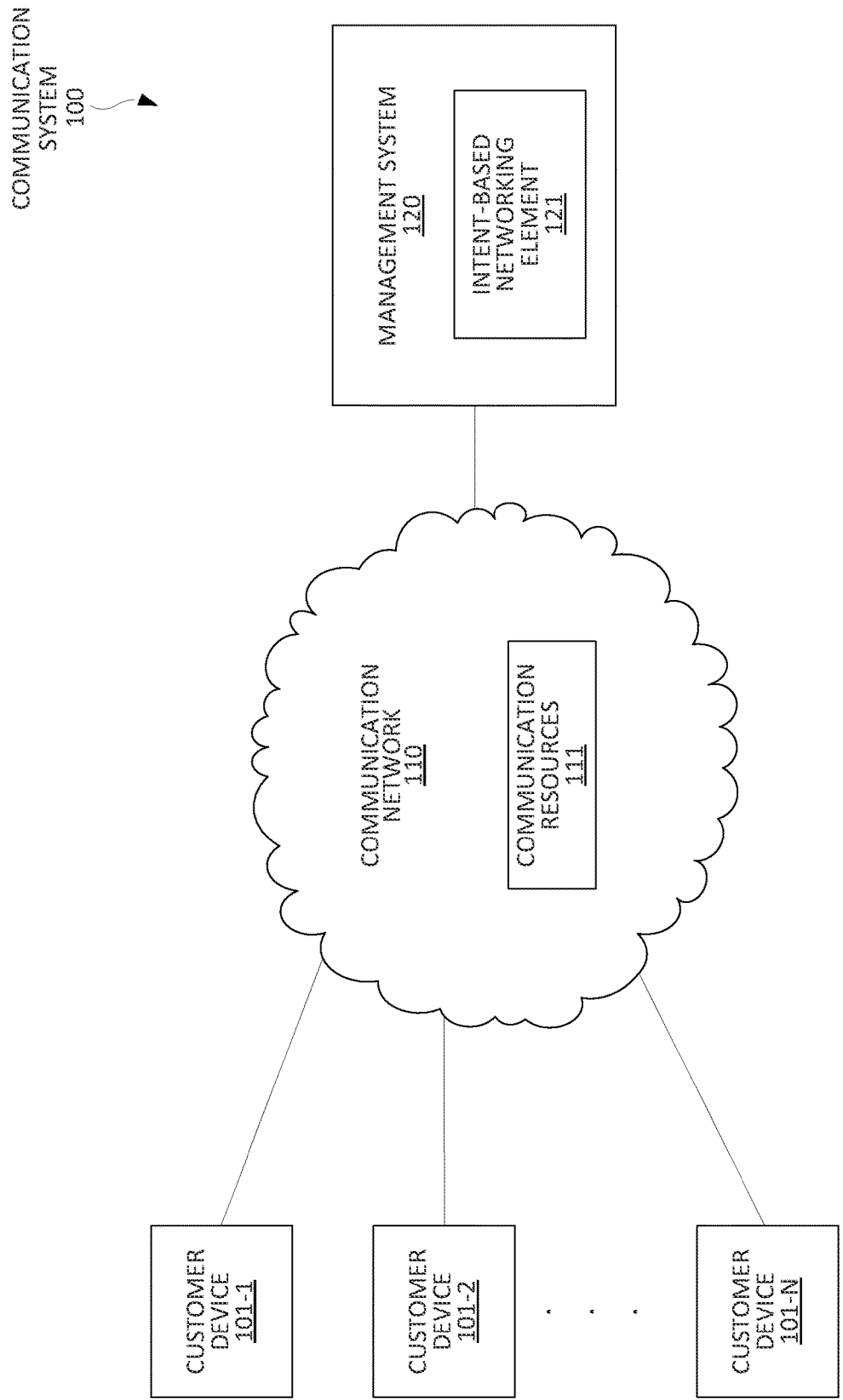
FIG. 1 depicts an example embodiment of a communication system including a management system configured to support intent-based networking for a communication network.

FIG. 1 depicts an example embodiment of a communication system including a management system configured to support intent-based networking for a communication network.

The communication system 100 is configured to support intent-based networking (IBN). The communication system 100 includes a set customer devices (CDs) 101-1 to 101-N (collectively, CDs 101), a communication network (CN) 110, and a management system (MS) 120, each of which may be configured to support various aspects of IBN. It is noted that, the operation of the CDs 101, CN 110, and MS 120 in supporting various aspects of IBN may be further understood by first considering various aspects of IBN more generally, at least some of which may be utilized in the communication system 100 to support IBN.

In general, IBN may be configured to support management of a network based on intents defining what the network is to accomplish. IBN may be configured to provide automated control of a communication network to satisfy business intents by translating the business intents into policies that can be applied within the communication network. IBN may be configured to provide network administrators the ability to define what they want the network to do and to provide an automated network management platform to create the desired state and enforce policies, thereby providing the network administrators more control over the network (e.g., network administrators can send a request to tell the network what outcome they want, i.e., their intent, instead of needing to determine and execute individual tasks manually in order to achieve the desired outcome). IBN may be configured to enable a network administrator to configure a network to address and support a business case as opposed to having to perform the individual configuration tasks to achieve the business case (e.g., if the administrator knows what they want the network to accomplish, the network can figure out how to accomplish it while adhering to previously deployed policies and, further, can continuously perform self-checks as the network changes to ensure that the network is continuing to operate as expected to support the business case). IBN may be configured to automate time-consuming tasks and provide real-time visibility into the state of the network to validate a given intent, predict potential deviations to the intent, and prescribe the action required to ensure that intent. IBN may be configured to enable the network to self-monitor and self-correct, thereby ensuring that intents are satisfied and continue to be satisfied. IBN may be configured to provide networking-as-a-service (NaaS), such as by providing lifecycle management software for networking infrastructure that bridges the gap between business and information technology (IT). IBN may be configured to apply a deeper level of intelligence and intended state insights to networking, enabling handling of the insights in a manner that replaces manual processes of configuring networks and reacting to network issues, and, thus, making the network faster, more agile, and less error-prone. IBN may be configured to support various other features, functions, advantages, or the like, as well as various combinations thereof. It will be appreciated that communication system 100 may be configured to support such functions in order to support IBN.

In general, IBN may support various functions to support management of a network based on intents defining what the network is to accomplish. For example, the communication system 100 may support IBN by supporting IBN functions such as intent translation and validation functions, automated implementation functions, network state awareness functions, assurance functions, or the like, as well as various combinations thereof.

For example, as indicated above, the communication system 100 may support various intent translation and validation functions. For example, the system may take higher-level business policies (what) as input from end users, translate the higher-level business policies (what) into the necessary network configuration (how) capable of providing the higher-level business policies (what), and validate the integrity of the resulting network configuration (how). The system verifies that the higher-level business policies can be supported in the network before implementing the higher-level business policies in the network. It will be appreciated that the communication system 100 may support various other intent translation and validation functions.

For example, as indicated above, the communication system 100 may support various automated implementation functions. For example, the system can configure the appropriate network configuration (how) across the existing network infrastructure (e.g., using manipulation of network resources to create a desired state of the network that is based on the higher-level business policies (what)). This may be done using network orchestration, network automation, or the like, as well as various combinations thereof. It will be appreciated that the communication system 100 may support various other automated implementation functions.

For example, as indicated above, the communication system 100 may support various network state awareness functions. For example, the system can gather data from the network to constantly monitor the state of the network. The system may continuously monitor the state of the network for satisfaction of intents (e.g., initial satisfaction at the time of provisioning, continued satisfaction over time through network changes, or the like, as well as various combinations thereof), compliance with policies, identification of problems or potential problems, identification of security threats or potential security threats, or the like, as well as various combinations thereof. It will be appreciated that the communication system 100 may support various other network state awareness functions.

For example, as indicated above, the communication system 100 may support various assurance functions. The system may constantly ensure that the desired state of the network is maintained (e.g., based on use of machine learning to choose the best way to implement the desired state and to take automated corrective action to maintain the desired state). For example, the system may continuously (e.g., in real time) verify that the original business intent of the system is being met and, if it is no longer being met or is still being met but may not continue to be met (e.g., based on a prediction that it may not continue to be met), can take preventative or corrective actions (e.g., providing notifications, performing network reconfiguration actions, modifying network capacity, rerouting or blocking traffic, or the like). It will be appreciated that the communication system 100 may support various other assurance functions.

It will be appreciated that the communication system 100 may be configured to support IBN based on support for various other IBN functions.

In general, IBN may utilize various technologies and capabilities to support management of a network based on intents defining what the network is to accomplish. For example, the communication system 100 may support IBN by supporting various technologies and capabilities, e.g., network orchestration (NO), artificial intelligence (AI) such as machine learning (ML), or the like, as well as various combinations thereof.

For example, as indicated above, the communication system 100 may utilize NO functions to support various IBN functions. NO tools may be configured to use automation to provide network services on networking devices. For example, an NO controller (which also may be referred to as a network orchestrator) can support the implementation of various services (e.g., Layer 2 (L2) and Layer 3 (L3) VPNs, Border Gateway Protocol (BGP) peering, access control lists (ACLs) on hardware devices, virtual appliances, Software Defined Networking (SDN) controllers, or the like, as well as various combinations thereof) using various architectures, interfaces, and protocols (e.g., Representational State Transfer (REST), Command Line Interface (CLI), Simple Network Management Protocol (SNMP), Network Configuration Protocol (NETCONF), or the like, as well as various combinations thereof) in order to support configuration of the network to implement and maintain intents. It will be appreciated that the communication system 100 may utilize various other NO functions to support various IBN functions.

For example, as indicated above, the communication system 100 may utilize AI, including ML, to support various IBN functions. ML gives IBN the ability to prescribe and perform routine tasks, set policies, respond to system events, and verify that goals and actions have been achieved. For example, based on ML, IBN can make servers reachable from specific networks, if that is what is required to achieve a given intent. The system not only configures network changes, but also verifies that they are being performed, and it can make adjustments as necessary. ML also gives IBN the ability to analyze data, extract information from data, and learn from the extracted data automatically, without being explicitly programmed. ML also may support various other IBN functions. It will be appreciated that the communication system 100 may utilize various other ML functions to support various IBN functions.

It will be appreciated that such functions, or various combinations thereof, enable IBN to reduce the complexity of network policy management and maintenance, simplify the deployment of network services, and so forth.

It will be appreciated that the communication system 100 may be configured to support IBN based on support for various other technologies and capabilities.

In communication system 100, the use of IBN may provide various advantages over various aspects of traditional networking and even over various aspects of SDN-based networking.

For example, use of IBN within the communication system 100 may enable efficient implementation of business goals into network configurations. Using IBN, a set of high-level business goals may be immediately and efficiently translated into a set of optimal network configurations that support the set of high-level business goals. This may save a significant amount of time typically spent planning, testing, and manually configuring the network.

For example, use of IBN within the communication system 100 may enable significant reductions in, or even elimination of, manual tasks performed in order to support a set of high-level business goals. Using IBN, commands for supporting policies or business needs within the network may be automatically translated into actions which may be applied to the network to support the policies or business needs, thereby obviating the need for network administrators to configure the network to comply with the policies or business needs. In other words, the network does the thinking without requiring human intervention, including verifying that a configuration will work, suggesting options for the configuration, making the changes to adapt to the desired configuration, performing self-repair operations, and so forth.

For example, use of IBN within the communication system 100 may enable more efficient monitoring, troubleshooting, and resolution. Using IBN, the network may continuously monitor itself for satisfaction of intents, compliance with policies, identifying problems or potential problems, identifying security threats or potential security threats, or the like, as well as various combinations thereof. This enables faster troubleshooting and resolution (e.g., since an intent-based network is continuously monitoring itself, performance issues are identified immediately and the intent-based network can resolves these issues, such as by using ML to determine and implement the best solution), reduced risk of being out of compliance (e.g., since an intent-based network is constantly monitoring itself and correcting issues, the intent-based network stays in compliance with any policies), better security (e.g., since an intent-based network is continuously monitoring itself, it is able to constantly look for threats, even in encrypted traffic, such that security breaches may be quickly identified and mitigated), and so forth.

For example, use of IBN within the communication system 100 may enable use of various analytics, including optimized analytics, for continuously improving various aspects of the network. Using IBN, the network may constantly gathering data about itself that can be analyzed in various ways to provide valuable information about network performance, security threats, or the like, as well as various combinations thereof. The analytics may be performed based on AI and, in particular, ML. The results of the analysis of the network provides an understanding of how the network is performing and, thus, may result in better decisions that produce better business outcomes.

It will be appreciated that most of these advantages or potential advantages may result in various types of savings, such as costs savings, time savings, and so forth.

It will be appreciated that use of IBN within the communication system 100 may be configured to provide various other advantages or potential advantages.

The communication system 100, as indicated above, includes the CDs 101, the CN 110, and the MS 120, each of which may be configured to support various aspects of IBN within the communication system 100.

The CDs 101 may include various types of devices which may interact with the CN 110. The CDs 101 may include end devices of customers which may be used by customers to control use of the CN 110 by the customer, such as by sending requests for intents (e.g., network intents, service intents, or the like) that the customer would like the network provider of CN 110 to provide for the customer, receiving responses indicative that the CN 110 has been configured to satisfy the intents such that the customer may utilize the CN 110 for various purposes, or the like, as well as various combinations. The CDs 101 may include devices of customers which may communicate via the CN 110, such as after intents have been satisfied by the network provider of the CN 110 for the customers based on configuration of the CN 110 to support communications of the customers via the CN 110. For example, the CDs 101 may include end devices of individual customers, end devices of network administrators of enterprise customers, or the like. It will be appreciated that, in the various examples above, the CDs 101 may include devices such as desktop computers, laptop computers, smartphones, workstations, terminals, or the like.

The CN 110 may include various types of communication networks. For example, the CN 110 may include local area networks, access networks, metro networks, regional networks, global networks, or the like, as well as various combinations thereof. For example, the CN 110 may include wireline networks (e.g., digital subscriber line (DSL) networks, cable networks, optical networks, or the like), wireless networks (e.g., Third-Generation (3G) cellular networks, Fourth-Generation (4G) cellular networks, Fifth-Generation (5G) cellular networks, WiFi networks, satellite networks, or the like), or the like, as well as various combinations thereof. For example, the CN 110 may include datacenter (DC) networks, enterprise networks, factory networks, or the like, as well as various combinations thereof. It will be appreciated that various combinations of such example networks may be used to provide the CN 110 for which intent-based networking is supported.

The CN 110 includes communication resources 111 which are configured to support communications of the CN 110. The communication resources 111 may represent various types of resources of the CN 110, including physical resources (e.g., devices, computers, processors, memories, servers, switches, or the like), virtual resources (e.g., virtualized network functions (VNFs), virtual machines (VMs), virtual containers (VCs), or the like), or the like, as well as various combinations thereof. The communication resources 111 may represent various types of infrastructure of the CN 110, including physical infrastructure (e.g., network elements, devices, systems, or the like), virtual infrastructure (e.g., virtualized network elements, VNFs, or the like), or the like, as well as various combinations thereof. The communication resource 111 may represent various types of elements of the CN 110, such as physical elements, virtual elements, or the like, as well as various combinations thereof. For example, the elements may include network elements, such as access points, routers, switches, hubs, network functions (e.g., physical network functions, VNFs, or the like), or the like, as well as various combinations thereof. For example, the elements may include processing elements, such as physical servers or elements, virtual servers or elements, or the like, as well as various combinations thereof. It will be appreciated that the communication resources 111 of the CN 110 may include various other types of resources which may be deployed within a communication network such as the CN 110.

It will be appreciated that, although the CN 110 may include various types of networks in which IBN may be applied, various example embodiments for supporting IBN are primarily presented herein within the context of example embodiments in which the CN 110 represents a DC (e.g., single DC and the associated DC network which may support communications of the resources of the DC, a group of interconnected DCs and the associated intra-DC networks and inter-DC networks which may support communications of the resources of the DCs, or the like).

The MS 120 is configured to support IBN for the CN 110. The MS 120, as discussed further below, may be configured to support IBN at various layers of the CN 110 (e.g., at individual layers, across combinations of layers, or the like), for various types of intents (e.g., network intents, service intents, or the like), or the like, as well as various combinations thereof. The MS 120, as discussed further below, may be configured to support IBN for the CN 110 by supporting intents of customers (e.g., supporting handling of intents of customers for satisfying the intents in the CN 110, supporting monitoring of intents satisfied in the CN 110 for ensuring that the intents continue to be satisfied in the CN 110, or the like). The MS 120, as discussed further below, may be configured to support IBN for the CN 110 by providing various IBN support capabilities which may be applied to support IBN for the CN 110. The MS 120, as discussed further below, may be configured to support IBN for the CN 110 based on various interaction types, communications capabilities, or the like. It will be appreciated that the MS 120 may be configured to support IBN for the CN 110 in various other ways. It is noted that, as illustrated in FIG. 1, the MS 120 may include an IBN element 121 which may be configured to provide or support various IBN capabilities presented herein as being provided by the MS 120.

The MS 120 may be configured to support IBN at various layers of the CN 110, including at individual layers and across combinations of layers.

In one example, the MS 120 may be configured to support network-level IBN (e.g., for network intents to be satisfied within a network) for a network, for an underlay network that underlays one or more overlay networks, for an overlay network that overlays one or more underlay networks, or the like, as well as various combinations thereof. For example, in a DC context, MS 120 may be configured to support IBN for the underlay network of the DC, which may be managed by the DC provider, which may support an overlay network of a customer for connected resources of the DC for the customer. For example, in a DC context, MS 120 may be configured to support IBN for an overlay network provided for a customer for connected resources of the DC for the customer, which may be supported by an underlay network of the DC provider. It will be appreciated the MS 120 may be configured to support IBN at various other network layers including at individual network layers and across combinations of network layers.

In one example, the MS 120 may be configured to support service-level IBN (e.g., for service intents to be satisfied within a network) for a service, for a service that overlays one or more networks, or the like, as well as various combinations thereof. For example, in a DC context, MS 120 may be configured to support IBN for a service supported by the DC for a customer, where the service may be supported by an underlay network of the DC which may be managed by the DC provider for supporting services for customers. For example, in a DC context, MS 120 may be configured to support IBN for an overlay service supported by the DC for a customer, where the overlay service may be supported by an underlay service of the DC which may be managed by the DC provider. It will be appreciated the MS 120 may be configured to support IBN at various other service layers including at individual service layers, across combinations of service layers, across combinations of service layers and underlying network layers, or the like.

It will be appreciated that the MS 120 may be configured to support IBN at various other layers, combinations of layers, or the like, as well as various combinations.

The MS 120 may be configured to support IBN for various types of intents, including network intents and service intents.

In one example, the intents supported by the MS 120 for the CN 110 may include network intents. A network intent may be specified using one or more network intent parameters, which generally include parameters that are relatively easy for users to specify (e.g., based on business parameters and ideas rather than highly technical or complicated ideas or parameters), which may vary for different types of communication networks, and so forth. For example, for networks in general, the network intent parameters may include parameters such as total capacity or bandwidth to be supported, total number of connections to be supported, total number of network elements to be deployed, locations to be supported, or the like. For example, in the case of a DC network more specifically, the network intent parameters may include the total computing capacity to be supported by the DC, the number of servers to be deployed in the DC, the port types and port speeds of the ports of servers to be deployed in the DC, or the like. For example, in the case of a DC network, a network intent may include an indication that the customer would like a DC located in New York that is able to support 5000 VMs. It will be appreciated that other parameters may be used for network intents for other types of networks, networks arranged using other numbers or types of underlay and/or overlay networks in various combinations, or the like.

In one example, the intents supported by the MS 120 for the CN 110 may include service intents. A service intent may be specified using one or more service intent parameters, which generally include parameters that are relatively easy for users to specify (e.g., based on business parameters and ideas rather than highly technical or complicated ideas or parameters), which may vary for different types of communication networks, and so forth. For example, for networks in general, the service intent parameters may include parameters such as service type to be supported, locations between which the service is to be provided, or the like. For example, in the case of a DC network more specifically, the service intent parameters may include one or more DC locations between which the service will run, a number of tunnels to be supported, bandwidth of the tunnels to be supported, or the like. For example, in the case of a DC network, a service intent may include an indication that the customer would like two tunnels to support communications between a set of VMs in a DC in New York and a set of VMs in a DC in Los Angeles where the tunnels each support a particular bandwidth.

It will be appreciated that other parameters may be used for network intents for other types of networks, networks arranged using other numbers or types of underlay and/or overlay networks in various combinations, or the like.

It will be appreciated that the MS 120 may be configured to support IBN for various other intents, combinations of intents, or the like, as well as various combinations.

The MS 120 may be configured to support IBN for the CN 110 by supporting intents of customers. The MS 120 may be configured to support IBN for the CN 110 by supporting handling of intents of customers for satisfying the intents in the CN 110, including receiving intents from CDs 101, processing the intents to determine network configurations that satisfy the intents, configuring the CN 110 based on the network configurations that satisfy the intents, informing the customers that the intents have been satisfied within the CN 110, and so forth, thereby enabling the customers that specified the intents to utilize the CN 110 in the manner indicated by the intents. The MS 120 may be configured to support IBN for the CN 110 by supporting monitoring of intents satisfied in the CN 110, receiving state information from the CN 110 (e.g., network state information, service state information, or the like), analyzing the state information with respect to satisfied intents to determine whether the intents are still being satisfied, performing reconfiguration of the CN 110 based on indications that the intents are no longer being satisfied due to conditions in the CN 110, and so forth, thereby ensuring that the intents continue to be satisfied in the CN 110. The MS 120 may be configured to support IBN for the CN 110 by providing various IBN support capabilities which may be applied to support IBN for the CN 110 (e.g., inventory management, topology management, intent handling, intent validation, network configuration control, network configuration monitoring, intent monitoring, or the like, as well as various combinations thereof). It will be appreciated that such IBN support capabilities which may be supported by the MS 120 may be further understood by way of reference to an example embodiment of the MS 120 that is presented in FIG. 2. It will be appreciated that the MS 120 may be configured to support IBN for the CN 110 in various other ways.

The MS 120 may be configured to support IBN for the CN 110 based on various interaction types, communications capabilities, or the like.

The MS 120 may be configured to support IBN for the CN 110 based on interaction with the CDs 101. For example, the MS 120 may interact with CDs 101 of customers to receive requests or other information from the customers (e.g., intents, intent agreements, network change requests, service change requests, status requests, or the like), provide responses or other information to the customers (e.g., results of satisfaction of intents, results of requests for changes, results of requests for status, or the like), or the like, as well as various combinations thereof. It will be appreciated that the MS 120 may interact with the CDs 101, within the context of supporting IBN for the CN 110, in various other ways.

The MS 120 may be configured to support IBN for the CN 110 based on interaction with the CN 110. For example, the MS 120 may interact with the CN 110 for obtaining network capability information (e.g., network inventory information for network elements of the CN 110, network element capability information for network elements of the CN 110, or the like), obtaining network configuration information of the CN 110 (e.g., network topology information of the CN 110, network element configuration information for network elements of the CN 110, or the like), providing network configuration instructions to the CN 110 for configuring the CN 110 (e.g., based on intents, based on change requests from customers, or the like), obtaining network status information of the CN 110 (e.g., based on queries, based on configuration of telemetry control information for controlling status information reported by network elements of the CN 110, or the like), providing status information reporting control information to the CN 110 for configuring the CN 110 to report status information (e.g., telemetry control information for controlling status information reported by network elements of the CN 110), or the like, as well as various combinations thereof.

The MS 120 may support various communications capabilities to support interaction with the CDs 101 for supporting IBN for the CN 110, to support interaction with the CN 110 for supporting IBN for the CN 110, or the like, as well as various combinations thereof. The MS 120 may support communications capabilities such as Application Programming Interfaces (APIs), OpenAPIs, protocols, or the like. For example, MS 120 may support various OpenAPIs (e.g., Web User Interface (WebUI), REST, or the like) for supporting communication of various types of information (e.g., orchestration information, automation information, analytics information, or the like) with various elements (e.g., elements of the MS 120, other management systems and controllers, or the like). For example, the MS 120 may support various OpenAPIs (e.g., NETCONF, Yet Another Next Generation (YANG), or the like) for interacting with the CN 110. It will be appreciated that the MS 120 may support various other communications capabilities to support interaction with the CDs 101 for supporting IBN for the CN 110, to support interaction with the CN 110 for supporting IBN for the CN 110, or the like, as well as various combinations thereof.

It will be appreciated that the MS 120 may be configured to support IBN for the CN 110 based on support for various other functions, capabilities, or the like, as well as various combinations thereof.

The MS 120 may be configured to support IBN in various contexts, such as greenfield contexts (e.g., where the customer is planning to build a new network that is based on IBN), brownfield contexts (e.g., where the customer has an existing network and is planning to modify the network to use IBN within the existing network), or the like.

In one example, the MS 120 may be configured to support IBN in greenfield contexts. Here, a customer may decide to build a network from the ground up and deploy the network for use (e.g., an access network, a DC network, or the like), and may interface with the entity that controls MS 120 for this purpose (e.g., the customer may build and operate the CN 110 with the support of MS 120). For example, the MS 120 may receive a network intent for a network that a customer would like to deploy and operate, determine a network design for the network and provide the network design to the customer, receive an indication that the customer has accepted the network design, provide network requirement information (e.g., the equipment to buy, how to arrange the equipment, or the like) to the customer, detect the equipment after it is deployed and activated by the customer (e.g., the customer may use the network requirement information as a basis for buying and deploying the equipment), and configure the network based on the network design. At this point, the MS 120 is the source of truth for the network and can manage the network using IBN. It will be appreciated that there may be multiple design iterations between the customer and the MS 120 (or the entity that controls or provides the MS 120) before the network design for the network is approved and deployed. It will be appreciated that, although primarily described with respect to supporting greenfield deployment for using IBN at the network level, greenfield deployment also may be used at the service level for supporting greenfield deployment of services to a network (e.g., an existing network, a new network such as where the greenfield deployment includes both the network and associated services, or the like).

In one example, the MS 120 may be configured to support IBN in brownfield contexts. Here, a customer with an existing network (e.g., an access network, a DC network, or the like) that does not support IBN may decide to modify the network to support IBN, and may interface with the entity that provides MS 120 for this purpose (e.g., the customer may deploy the MS 120 in order to operate the CN 110, based on IBN, with the support of MS 120). For example, the MS 120 may receive network configuration information indicative of the configuration of the CN 110, obtain an original network intent of the customer for the CN 110 (e.g., receive the original network intent for the CN 110 from the customer, reconstruct the original network intent for the CN 110 based on the network configuration information indicative of the configuration of the CN 110, or the like), determine an actual network result for the CN 110 based on analysis of the network configuration information indicative of the configuration of the CN 110, determine based on the original network intent for the CN 110 and the actual network result for the CN 110 whether the original network intent for the CN 110 has been satisfied by the CN 110 (e.g., based on a determination of a delta, if any, between the original network intent for the CN 110 and the actual network result for the CN 110), and perform a management action based on whether the original network intent for the CN 110 has been satisfied by the CN 110 (e.g., notifying the customer of the results, performing one or more reconfiguration actions on the CN 110 to configure the CN 110 to achieve the original network intent, or the like). It will be appreciated that, although primarily described with respect to supporting brownfield deployment for using IBN at the network level, brownfield deployment also may be used at the service level for supporting brownfield deployment of services to a network (e.g., an existing network, a new network such as where the brownfield deployment includes both the network intents and associated service intents, or the like). It will be appreciated that various aspects of supporting brownfield deployment of IBN may be further understood by way of reference to FIG. 2 and FIG. 3.

It will be appreciated that the MS 120 may be configured to support IBN in various other contexts or combinations of contexts.

The MS 120 may be configured to support scalability for use of IBN in the CN 110. The MS 120 may be configured to support scalability for use of IBN in the CN 110 based on use of a message bus configured to support scalable exchange of data between elements of the MS 120. The message bus may be configured to support a publisher-subscriber model for transfer of data between elements of the MS 120. For example, an inventory management element of the MS 120 may publish inventory information for the CN 110 which may be subscribed to by other elements of MS 120 which may support handling of network intents based on such inventory information. For example, a network status information management element of the MS 120 may publish network status information received from the CN 110 which may be subscribed to by other elements of MS 120 which may support handling of network intents based on such network status information. It will be appreciated that the message bus may be configured to support exchanges of various other types of data, exchanges between various other elements of MS 120, or the like, as well as various combinations thereof. The message bus may be configured to support a publisher-subscriber model for transfer of data between elements of the MS 120 based on use of topics, where a topic may correspond to a type of information for which publication and subscription are supported (e.g., an inventory information topic or network status information topic in the examples provided above). The message bus may be configured to support a publisher-subscriber model for transfer of data between elements of the MS 120, based on use of topics, based on partitioning of topics (e.g., data items within the topic may be hashed into partitions and the number of partitions supported may be dynamically managed to support scalability). It will be appreciated that various aspects of supporting scalability for use of IBN may be further understood by way of reference to FIG. 2, FIG. 4, and FIG. 5.

The MS 120 may be configured to support redundancy for use of IBN in the CN 110. The MS 120 may be configured to support redundancy for use of IBN in the CN 110 based on use of a pair of instances of the MS 120. For example, where a customer operates two DCs, one on the east coast of the United States and the other on the west coast of the United States, the customer may use a first instance of the MS 120 to manage the first DC on the east coast and a second instance of the MS 120 to manage the second DC on the west coast. It will be appreciated that, although primarily described as being separate instances of the same MS 120, in some cases the management of the two DCs may be performed using two separate management systems. The MS 120 may be configured to support redundancy for use of IBN in the CN 110 based on use of a pair of message buses associated with the pair of instances of the MS 120. The pair of messages buses associated with the pair of instances of the MS 120 may support bidirectional mirroring of data between the two message buses, bidirectional health monitoring between the two message buses, and failover and recovery handling by the two message buses, for supporting redundancy of the message bus functions of the pair of message buses associated with the pair of instances of the MS 120. In one example, bidirectional mirroring of data between the two message buses may include, for a given topic supported by the two message buses, the first message bus is a publisher to the second message bus which is then a subscriber for the data of the topic received by the first message bus from an element publishing the data to the first message bus on the first instance of the MS 120 and the second message bus is a publisher to the first message bus which is then a subscriber for the data of the topic received by the second message bus from an element publishing the data to the second message bus on the second instance of the MS 120. In one example, bidirectional health monitoring between the two message buses, which allows either of the message buses to detect unavailability of the other of the message buses (e.g., the associated instance of the MS 120 fails), may be based on sending of and monitoring for heartbeat messages exchanged between the message buses. In one example, failover handling by the message buses may be performed such that, if either message bus becomes unavailable, then the active message bus can support subscribers from both instances of the MS 120 based on partition management within the topic by the active message bus (e.g., using one set of partitions within the topic for subscribers from the instance of the MS 120 with which the active message bus is associated and a second set of partitions within the topic for subscribers from the instance of the MS 120 with which the unavailable message bus is associated). It will be appreciated that various aspects of supporting redundancy for use of IBN may be further understood by way of reference to FIG. 2, FIGS. 6A-6C, FIG. 7, and FIG. 8.

The MS 120 may be configured to support changes to the CN 110. For example, a customer may wish to make changes to network configurations, service configurations, or the like, as well as various combinations thereof. The MS 120 may be configured to support changes to the CN 110 based on validation of the changes to the CN 110, where the changes may be validated after being implemented within the CN 110 (e.g., if the changes are validated then the changes may be retained, otherwise the changes may be reversed based on a determination that the changes cannot be validated) or may be validated before being implemented within the CN 110 (e.g., if the changes are validated then the changes may be implemented within the CN 110, otherwise the changes may be prevented from being implemented within the CN 110 based on a determination that the changes cannot be validated). The MS 120 may be configured to support changes to the CN 110, based on validation of the changes to the CN 110 after the changes are effected in the CN 110, by receiving a request for a change, executing the change in the CN 110, receiving status information from one or more network elements of the CN 110 (e.g., based on use of telemetry for controlling reporting of status information from network elements of the CN 110), determining, based on the status information, a result of execution of the change on the CN 110 (e.g., whether one or more intents are still satisfied after the change), and performing one or more management actions based on the result of execution of the change on the CN 110 (e.g., notifying the customer of the result of the change, performing reconfiguration of the CN 110 to remove the change, or the like, as well as various combinations thereof). The MS 120 may be configured to support changes to the CN 110, based on validation of the changes to the CN 110 before the changes are effected in the CN 110, by receiving a request for a change, executing the change in a representative network configured to represent the CN 110, receiving status information from one or more network elements of the representative network configured to represent the CN 110 (e.g., based on use of telemetry for controlling reporting of status information from network elements of the representative network configured to represent the CN 110), determining, based on the status information from network elements of the representative network configured to represent the CN 110, an expected result of execution of the network change on the CN 110, and performing one or more management actions based on the expected result of execution of the network change on the CN 110 (e.g., notifying the customer of the result of the change, performing reconfiguration of the CN 110 to implement the change within the CN 110, or the like, as well as various combinations thereof). It will be appreciated that the representative network configured to represent the CN 110 is a network that is configured to mirror the CN 110 such that execution of changes in the representative network configured to represent the CN 110 will provide an indication as to the effect of those changes if executed in the CN 110, such as a replica or near replica of the CN 110 (e.g., a physical network that is configured to mirror the CN 110, a virtual network that is configured to mirror the CN 110, a sandbox network configured to mirror, or emulate, the CN 110 (which itself may be a physical network, virtual network, or a combination thereof), or the like, as well as various combinations thereof. It will be appreciated that various aspects of supporting changes to a network based on use of IBN may be further understood by way of reference to FIG. 2 and FIG. 9.

It will be appreciated that the MS 120 may be configured to support various other functions for supporting various aspects of IBN for the CN 110.

It will be appreciated that the communication system 100 may be configured to support various other functions for supporting various aspects of IBN.

Figure 2:
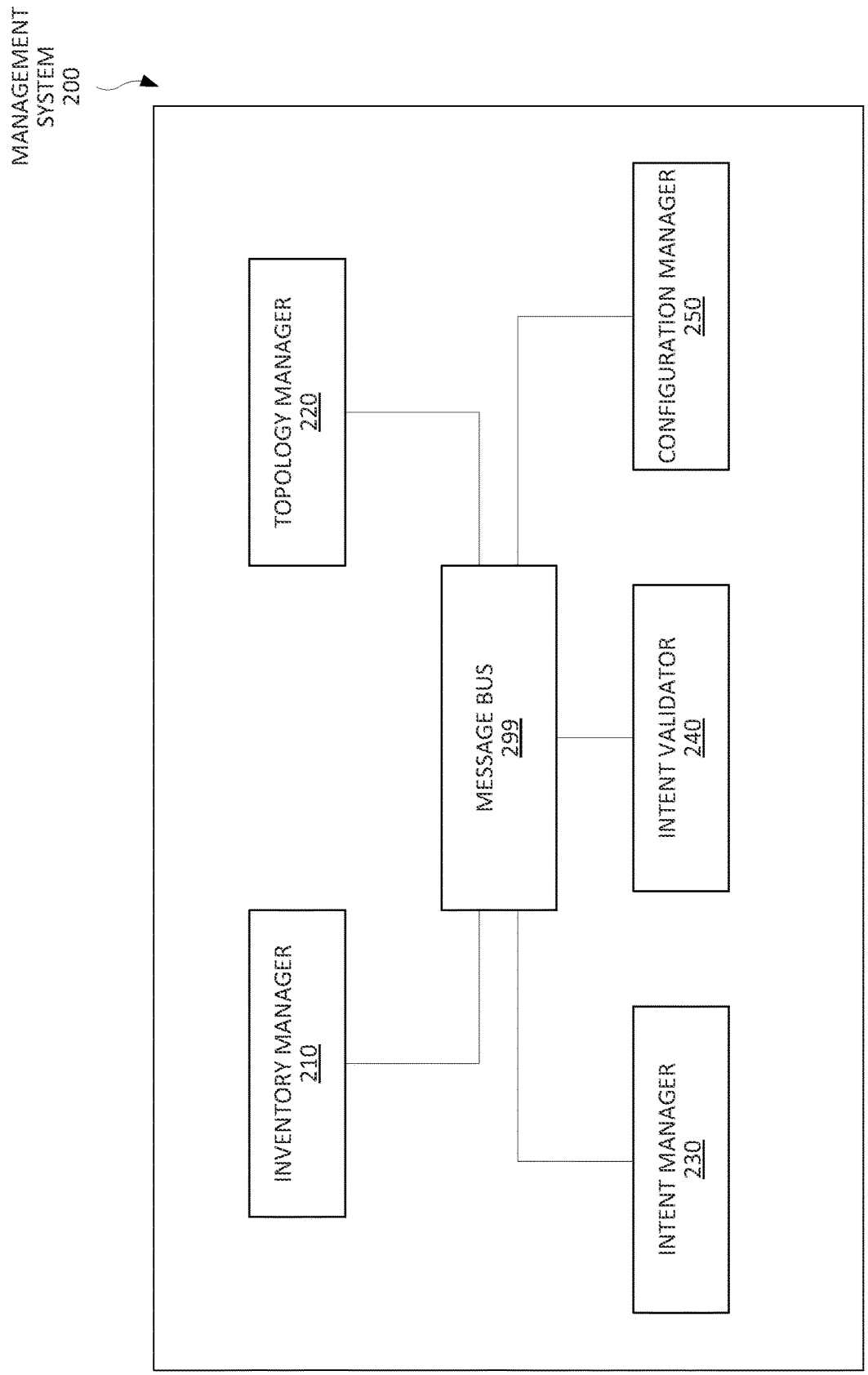
FIG. 2 depicts an example embodiment of a management system configured to support intent-based networking for a communication network.

FIG. 2 depicts an example embodiment of a management system configured to support intent-based networking for a communication network.

As depicted in FIG. 2, the management system (MS) 200 includes a number of elements configured to support IBN within a communication network (which has been omitted from FIG. 2 for purposes of clarity). Namely, the MS 200 includes an inventory manager (IM) 210, a topology manager (TM) 220, an intent manager (IM) 230, an intent validator (IV) 240, and a configuration manager (CM) 250. It will be appreciated that the MS 200 may include various other elements, including fewer or more elements as well as different elements, which may be configured to support IBN within a communication network. It will be appreciated that the MS 200 of FIG. 2 may be used as the MS 120 within the communication system 100 of FIG. 1 for supporting IBN for the CN 110 within the communication system 100 of FIG. 1.

The IM 210 is configured to perform inventory management for the MS 200. The IM 210 may be considered to be the source of truth for inventory information of the communication network managed by the MS 200. The inventory information may include lists of elements of the communication network and associated information for the elements of the communication network (e.g., lists of the elements, lists of the elements per location, element description information for the elements (e.g., unique element identifier, element type, element location, element capacity (e.g., numbers of ports, port speeds of ports of the port types, or the like)), or the like, as well as various combinations thereof). The IM 210 may obtain and maintain inventory information for new elements as the new elements become active within the communication network (e.g., where customers purchase, deploy, and activate the elements), update inventory information for existing elements as the existing elements change within the communication network (e.g., as elements fail, as elements are retired from the communication network, or the like), remove existing inventory information for existing elements as the existing elements are decommissioned and removed from the communication network, or the like, as well as various combinations thereof. The IM 210 may make the inventory information available to other elements of the MS 200 (e.g., TM 220, IM 230, IV 240, or the like) for various purposes (e.g., analyzing intents for satisfying the intents, ensuring that intents satisfied in the communication network continue to remain satisfied, or the like, as well as various combinations thereof). The IM 210 may be configured to support various other functions for supporting IBN by the MS 200 for the associated communication network.

The TM 220 is configured to perform topology management for the MS 200. The TM 220 may be considered to be the source of truth for topology information of the communication network managed by the MS 200. The topology information may include information describing the arrangement of elements (e.g., network elements, network links, or the like) of the communication network (e.g., lists of network elements per location, lists of connections between ports of network elements, connection description information for connections between ports of network elements (e.g., unique connection identifiers, connection types, connection endpoints, connection bandwidth, or the like), or the like, as well as various combinations thereof). The TM 220 may obtain and maintain topology information for the communication network based on interaction with elements of MS 200 (e.g., information obtained by the MS related to satisfaction of intents in the communication network based on configuration of the communication network), based on interaction with elements of the communication network (e.g., status information from elements of the communication network where the status information may be indicative of connections currently active within the communication network), or the like, as well as various combinations thereof. The TM 220 may make the topology information available to other elements of the MS 200 (e.g., IM 210, IM 230, IV 240, or the like) for various purposes (e.g., analyzing topology information to validate inventory information, analyzing intents for satisfying the intents, ensuring that intents satisfied in the communication network continue to remain satisfied, or the like, as well as various combinations thereof). The TM 220 may be configured to support various other functions for supporting IBN by the MS 200 for the associated communication network.

The IM 230 may be configured to perform intent management for the MS 200. The IM 230 may be configured to receive intents from customers, process the intents to determine network configurations that satisfy the intents, and request configuration of the communication network in a manner that satisfies the intents. This enables the customers that specified the intents to utilize the communication network in the manner indicated by the intents. The IM 230 may receive the intents directly from customer devices of the customers or from one or more elements of the MS 200 configured to interact with customer devices of the customers. The IM 230 may process the intents, to determine network configurations that satisfy the intents, based on information available at the MS 200 (e.g., using inventory information available from the IM 210, topology information available from the TM 220, or the like, as well as various combinations thereof). The IM 230 may determine network configurations that include network element configurations for each of the network elements of the network involved in satisfying the intents on which the network configurations are based. It will be appreciated that the network element configurations may be generic network element configurations (e.g., independent of the network element brands and models which may be provided by different equipment vendors) which may need to be converted into element-specific network element configurations (e.g., based on the network elements brands and models which may be supported by different equipment vendors) before being applied to the communication network or may be the element-specific network element configurations which may be applied to the communication network. The IM 230 may request configuration of the communication network in a manner that satisfies the intents by providing the network configurations to the CM 250 for enabling the CM 250 to configure the communication network in a manner that satisfies the intents. The IM 230 also may be configured to support various other functions for providing intent management for new networks (e.g., in a greenfield network scenario where new network equipment being is deployed, activated, and configured to satisfy an intent related to deployment of a new network, the IM 230 may detect that the deployed network equipment has been powered up and can be configured and may then request configuration of the deployed network equipment by the CM 250) or existing networks (e.g., for handling of brownfield deployments). The IM 230 may be configured to support various other functions for supporting IBN by the MS 200 for the associated communication network.

The IV 240 may be configured to perform intent validation for the MS 200. The IV 240 may be configured to identify intents to be validated and to perform intent validation for intents to be validated. This may be performed for intents before the intents are implemented within the communication network (e.g., validation that the communication can support the intents before the intents are deployed), after the intents are implemented within the communication network (e.g., for validation that the intents are still satisfied within the communication network), or the like, as well as various combinations thereof. The IV 240 may be configured to identify intents to be validated, analyze the intents to determine whether the intents may be satisfied within the communication network, and, based on a determination that the intents may be satisfied within the communication network, request configuration of the communication network in a manner than satisfies the intents, thereby ensuring that intents may be satisfied within the communication network before configuring the communication network to support the intents. The IV 240 may be configured to identify intents to be validated, analyze the intents to determine whether the intents are still satisfied within the communication network, and, based on a determination that certain intents are no longer satisfied within the communication network, request reconfiguration of the communication network in a manner than satisfies the intents, thereby enabling the intents specified by the customers to continue to be satisfied in the communication network. The IV 240 may identify intents to be validated based on requests from the IM 230 (e.g., the IM 230 may periodically validate intents, randomly select intents to be validated, validate intents based on indications that the intents are no longer satisfied or are in danger of no longer being satisfied, or the like, as well as various combinations thereof). The IV 240 may validate intents based on information available from the MS 200 (e.g., descriptions of the intents from IM 230, inventory information available from the IM 210, topology information available from the TM 220, or the like, as well as various combinations thereof), information from the communication network (e.g., status information from network elements associated with the satisfaction of the intents in the communication network), or the like, as well as various combinations thereof. The IV 240 may request reconfiguration of the communication network in a manner that satisfies the intents by providing the network configurations to the CM 250 for enabling the CM 250 to configure the communication network in a manner that satisfies the intents. The IV 240 may be configured to support various other functions for supporting IBN by the MS 200 for the associated communication network.

The CM 250 may be configured to manage configuration of the communication network for satisfying intents of customers.

The CM 250 may receive network configurations from the IM 230 and control configuration of the communication network based on the network configurations such that the communication network is configured to support the intents of the customers. The CM 250 may receive network configurations that include network element configurations for each of the network elements of the network involved in satisfying the intents on which the network configurations are based. The network element configurations may be element-specific network element configurations (e.g., based on the network elements brands and models which may be supported by different equipment vendors). The network element configurations may be generic network element configurations (e.g., independent of the network element brands and models which may be provided by different equipment vendors) which may need to be converted into element-specific network element configurations (e.g., based on the network elements brands and models which may be supported by different equipment vendors) before being applied to the communication network or may be the element-specific network element configurations which may be applied to the communication network. The CM 250, where the network element configurations are generic network element configurations rather than element-specific network element configurations, may convert the generic network element configurations into element-specific network element configurations that can be handled by the network elements being configured.

The CM 250 may control configuration of the communication network, based on the network configurations, by sending network configuration messages to network elements of the communication network for configuring the network elements of the communication network to support the network configurations configured to support the intents of the customers and receiving responses to the network configuration messages from the network elements of the communication network for verifying the configuration of the communication network to support the intents of the customer. The network configuration messages may be configured to control configuration of ports to support connections between network elements, configuration of routing tables or other tables of the network elements to support connections between network elements or exchanges of data between the network elements, or the like, as well as various combinations thereof. The responses to the network configuration messages from the network elements may include network configuration information which may be maintained by the MS 200 (e.g., by providing various portions of such information to various elements of the MS 200, such as the IM 210, the TM 220, or the like) such that the MS 200 has a current view of the configuration of the communication network to support the intents of the customer.

The CM 250, although depicted as a single element, may be composed of, or provided using, multiple elements such as a transaction manager and a configuration generator. The transaction manager may receive network configurations from the IM 230 for intents to be satisfied in the communication network, where the IM 230 instructs the transaction manager to execute the network configurations for configuring the network elements of the communication network to support intents. The transaction manager, where the network configurations include generic network element configurations rather than element-specific network element configurations, may request that the configuration generator generate, from the generic network element configurations, element-specific network element configurations that can be handled by the network elements being configured. The configuration generator may generate, from the generic network element configurations, element-specific network element configurations that can be handled by the network elements being configured and may provide the element-specific network element configurations back to the transaction manager for execution by the transaction manager for configuring the network elements of the communication network to support the intents. It will be appreciated that the CM 250 may be implemented in various other ways to provide such functions.

The CM 250 may be configured to support various other functions for supporting IBN by the MS 200 for the associated communication network.

As further depicted in FIG. 2, communications between elements of the MS 200 may be supported using a message bus (MB) 299. The various elements of MS 200 (namely, IM 210, TM 220, IM 230, IV 240, CM 250, or the like) are connected to the MB 299 for supporting communications between the elements of MS 200. The MB 299 may be configured to use topics for supporting exchange of information between elements of the MS 200. The MB 299 may be configured to use a publisher-subscriber model for supporting topic-based exchanges of information between elements of the MS 200. For example, where "inventory" is a topic supported by the MB 299, the MB 299 may support exchanging of inventory information between the IM 210 and the other elements of the MS 200 which may need the inventory information (e.g., elements, such as TM 220, IM 230, IV 240, or the like) by enabling the IM 210 to publish the inventory information to the inventory topic and enabling the other elements of the MS 200 which are interested in the inventory information to subscribe to the inventory topic to receive the inventory information published by the IM 210. For example, where "topology" is a topic supported by the MB 299, the MB 299 may support exchanging of topology information between the TM 220 and the other elements of the MS 200 which may need the inventory information (e.g., elements, such as IM 230, IV 240, or the like) by enabling the TM 220 to publish the topology information to the topology topic and enabling the other elements of the MS 200 which are interested in the topology information to subscribe to the topology topic to receive the topology information published by the IM 210. It will be appreciated that various example embodiments of the MB 299 may be further understood from FIG. 4 and FIG. 5 (e.g., example embodiments by which the MB 299 may support scalability of the MS 200) and FIGS. 6A-6C, FIG. 7, and FIG. 8 (e.g., example embodiments by which the MB 200 may support redundancy of the MS 200. It will be appreciated that, although primarily presented with respect to use of the MB 299 to support communications between the elements of MS 200, the MB 299 also may be used to support communications between the elements of MS 200 and other elements external to MS 200 (e.g., CDs such as the CDs 101 of FIG. 1, elements of the communication network such as elements of the CN 110, or the like, as well as various combinations thereof).

It will be appreciated that, although primarily presented with respect to a specific implementation of MS 200 (e.g., supporting specific functions, including specific elements configured to provide such functions, providing a specific arrangement of the elements, or the like), MS 200 may be implemented in various other ways (e.g., supporting various other functions or combinations of functions, including various other elements or combinations of elements configured to provide such functions, providing various other arrangements of elements, or the like, as well as various combinations thereof).

It will be appreciated that a management system configured to support management of a network based on IBN may be configured to support various functions.

In at least some example embodiments, a greenfield deployment of a management system, configured to support management of a network based on IBN, may be supported. Here, the management system may be MS 120 of FIG. 1, MS 200 of FIG. 2, or any other suitable management system or device. For example, a customer may decide to build a network from the ground up and deploy the network for use (e.g., an access network, a DC network, or the like), and may interface with the entity that controls management system for this purpose (e.g., the customer may build and operate the communication network with the support of the management system). For example, the management system may receive a network intent for a network that a customer would like to deploy and operate, determine a network design for the network and provide the network design to the customer, receive an indication that the customer has accepted the network design, provide network requirement information (e.g., the equipment to buy, how to arrange the equipment, or the like) to the customer, detect the equipment after it is deployed and activated by the customer (e.g., the customer may use the network requirement information as a basis for buying and deploying the equipment), and configure the network based on the network design. This enables the management system to operate as the source of truth for the network and to manage the network using IBN. It will be appreciated that there may be multiple design iterations between the customer and the management system (or the entity that controls or provides the management system) before the network design for the network is approved and deployed. It will be appreciated that, although primarily described with respect to supporting greenfield deployment for using IBN at the network level, greenfield deployment also may be used at the service level for supporting greenfield deployment of services to a network (e.g., an existing network, a new network such as where the greenfield deployment includes both the network and associated services, or the like).

In at least some example embodiments, a brownfield deployment of a management system, configured to support management of a network based on IBN, may be supported. Here, the management system may be MS 120 of FIG. 1, MS 200 of FIG. 2, or any other suitable management system, control system, or the like. For example, a customer with an existing network (e.g., an access network, a DC network, or the like) that does not support IBN may decide to modify the network to support IBN, and may interface with the entity that provides management system for this purpose (e.g., the customer may deploy the management system in order to operate the network, based on IBN, with the support of the management system). The management system, as discussed further below, may be configured to support various functions enabling the management system to be deployed in a brownfield context.

In at least some example embodiments, a management system configured to support management of a network based on IBN may support a brownfield deployment for a network by receiving network configuration information indicative of the configuration of the network, obtaining a network intent for the network, determining a network result for the network, determining based on the network intent for the network and the network result for the network whether the network intent for the network has been satisfied, and performing a management action based on whether the network intent for the network has been satisfied.

The management system being deployed in the brownfield context may receive the network configuration information indicative of the configuration of the network in various ways. For example, the management system may receive at least a portion of the network configuration information from the network (e.g., querying network elements for network configuration information upon being connected to the network, subscribing to network element telemetry for obtaining the network configuration information upon being connected to the network for receiving network configuration information based on telemetry processes supported by network elements of the network, or the like, as well as various combinations thereof). For example, the management system may receive at least a portion of the network configuration from one or more other systems associated with the network (e.g., inventory management systems, topology management systems, element management systems, network management systems, or the like, as well as various combinations thereof). For example, the management system may reconstruct at least a portion of the network configuration information indicative of the configuration of the network based on various other types of information which may be obtained by the management system (e.g., network inventory information, network element status information, services information, or the like, as well as various combinations thereof). It will be appreciated that the management system may obtain the network configuration information in various other ways.

The management system being deployed in the brownfield context may obtain the network intent in various ways. Here, it will be appreciated that the network intent may be the network intent of the customer, which may or may not have been explicitly specified by the customer at the time that the network was designed and deployed (e.g., depending on whether IBN was applied at the time that the network was designed and deployed or at a time thereafter). The network intent may be specified using one or more network intent parameters which, as discussed herein, may vary for different types of networks, for customers depending on the manner in which the customers would prefer to describe the goals for the networks, or the like, as well as various combinations thereof. For example, network intent parameters may include one or more location parameters, one or more network capacity parameters, one or more network configuration parameters (e.g., network locations and the manner in which the network locations are connected), or the like, as well as various combinations thereof. It will be appreciated that the network intent may be specified in various other ways (e.g., using less or more parameters, using different parameters, or the like, as well as various combinations thereof).

In one example, the management system may obtain the network intent for the network from the customer (e.g., the customer may explicitly indicate the network intent that the customer was previously trying to achieve and/or is currently trying to achieve). For example, the management system may obtain the network intent for the network based on an input of the customer via the management system or via one or more other systems connected to the management system, based on interaction by the management system with one or more other systems of the customer (e.g., retrieving the network intent from one or more other systems of the customer), or the like, as well as various combinations thereof. It will be appreciated that the management system may obtain the network intent for the network from the customer in various other ways.

In one example, the management system may obtain the network intent for the network by reconstructing the network intent for the network from the network configuration information of the network. For example, in the case of a DC network, the management system may determine, based on analysis of the network configuration information (e.g., network element information for the network elements of the network, such as network element types of the network elements, port information for the ports available on the network elements (e.g., number of ports, port types, port speeds, or the like)), that the network intent for the network was to provide a network supporting a particular network capacity (e.g., such that it is able support communications of a particular set of VMs having a particular set of characteristics). It will be appreciated that the management system may reconstruct the network intent for the network based on the network configuration information of the network in various other ways.

It will be appreciated that the management system may obtain the network intent for the network in various other ways.

The management system being deployed in the brownfield context may determine the network result for the network in various ways. The management system may determine the network result for the network based the network configuration information of the network. It will be appreciated that, since the network result for the network may be used to evaluate the network to determine whether the configuration of the network satisfies the network intent for the network, the network result for the network may be represented in a format facilitating comparison of network result for the network to the network intent for the network (e.g., the network result for the network may be specified using the same set of one or more parameters used to specify the network intent for the network). For example, in the case of a DC network where the network intent for the network is simply a total capacity desired by the customer for the DC network, the network result for the network may be specified as a total capacity actually supported by the network given the current configuration of the network. It will be appreciated that, since network intents for networks may be specified using various other parameters or combinations of parameters, the network results for the networks also may be specified using such other parameters or combinations of parameters. It will be appreciated that the management system may determine the network result for the network in various ways.

It will be appreciated that, although primarily presented with respect to example embodiments in which the network intent for the network and the network result for the network are determined independently (although based on the network configuration information of the network), in at least some example embodiments the network intent for the network and the network result for the network may be determined in an interdependent manner. In at least some example embodiments, the network intent for the network may be determined based on the network configuration information of the network and the network result for the network (e.g., one or more network parameters used to define the network result also may be used as a basis for defining the network intent and associated values for the one or more network parameters may be determined for the network intent). For example, based on analysis of the network configuration information, it may be determined that configuration of the network achieved a particular network capacity (the network result for the network) and the identification of the network capacity as a parameter for the network may be used to determine a network intent for the network that is defined based on the network capacity parameter. In at least some example embodiments, the network result for the network may be determined based on the network configuration information of the network and the network intent for the network (e.g., one or more network intent parameters used to define the network intent also may be used as a basis for defining the network result and associated values for the one or more network parameters may be determined for the network result). For example, based on analysis of the network configuration information, it may be determined that the network intent for the network was to achieve a particular network capacity (the network intent for the network) and the identification of the network capacity as a parameter for the network may be used to determine a network result for the network that is defined based on the network capacity parameter. It will be appreciated that interdependent determination of the network intent for the network and the network result for the network may be determined in various other ways.

The management system being deployed in the brownfield context may determine whether the network intent for the network has been satisfied based on the network intent for the network and the network result for the network. The management system may determine whether the network intent for the network has been satisfied based on a comparison of the network intent for the network and the network result for the network (e.g., a comparison of the values of the one or more parameters used to measure the network intent for the network and the network result for the network). The management system may determine whether the network intent for the network has been satisfied based on a determination as to whether there is a delta between the network intent for the network and the network result for the network. The management system may, based on a determination that there is a delta between the network intent for the network and the network result for the network, may determine an extent of the delta between the network intent for the network and the network result for the network (e.g. for use in quantifying the extent to which the network intent for the network has not been achieved, for use in determining a reconfiguration of the network to satisfy the network intent for the network, or the like, as well as various combinations thereof). For example, in the case of a DC network where the network intent for the network is simply a total capacity desired by the customer for the DC network, the management system may determine that the network intent for the network is X capacity and that the network result for the network is Y capacity (where Y<X) and, further, may determine that the network result for the network falls short of the network intent of the network by [X−Y] capacity. It will be appreciated that the management system may determine whether the network intent for the network has been satisfied in various other ways.

The management system being deployed in the brownfield context may perform various types of management actions based on whether the network intent for the network has been satisfied.

In one example, the management actions may include providing a notification to the customer. For example, the management system may notify the customer of the results of the analysis performed by the management system for deploying the management system in the brownfield context. For example, the management system may notify the customer of the network intent (e.g., if or in case the customer is not aware of the network intent), notify the customer of the network result for the network, notify the customer of the existence of a delta between the network intent and the network result, notify the customer of the delta between the network intent and the network result to give the customer an indication of how closely the network is to achieving the network intent, or the like, as well as various combinations thereof. It will be appreciated that the management system may notify the customer of the results of the analysis performed by the management system in various ways (e.g., via a message displayed on an interface of the management system, via a message displayed on an interface of a system of the customer, via a message to a user device of an administrator or other stakeholder of the customer (e.g., instant message, email, or the like), or the like, as well as various combinations thereof).

In one example, the management actions may include performing one or more reconfiguration actions on the network. For example, the management system may perform one or more reconfiguration actions configured to reconfigure the network to change the network from a current configuration which provides the network result to a new configuration that satisfies the network intent for the network. For example, the management system may determine reconfigurations of one or more of the network elements of the network and may send configuration messages to the one or more network elements of the network for reconfiguring the network elements of the network to provide the new configuration that satisfies the network intent for the network. It will be appreciated that the management system may reconfigure the network elements of the network in various ways (e.g., using various protocols, message types, or the like, as well as various combinations thereof).

It will be appreciated that the management system may perform various other types of management actions based on whether the network intent for the network has been satisfied.

It will be appreciated that the brownfield deployment of the management system may be performed in various other ways.

Figure 3:
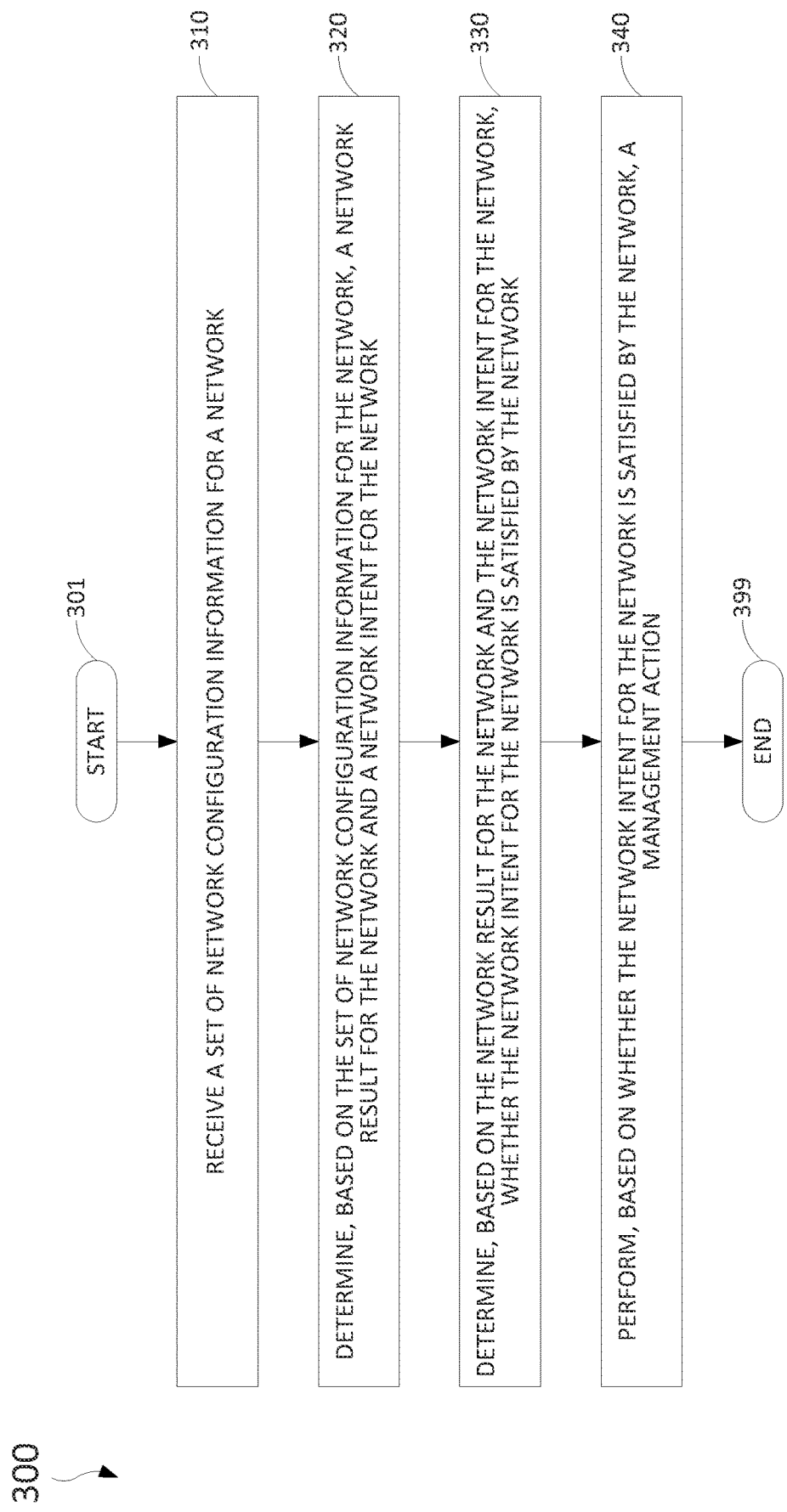
FIG. 3 depicts an example embodiment of a method for use by a management system, configured to support intent-based networking for a communication network, to support a brownfield deployment of the management system for the communication network.

It will be appreciated that various aspects of supporting brownfield deployment of IBN may be further understood by way of reference to FIG. 3.

FIG. 3 depicts an example embodiment of a method for use by a management system, configured to support intent-based networking for a communication network, to support a brownfield deployment of the management system for the communication network. It will be appreciated that, although primarily presented as being performed serially, at least a portion of the functions of method 300 may be performed contemporaneously or in a different order than as presented with respect to FIG. 3.

At block 301, method 300 begins.

At block 310, receive a set of network configuration information for a network. The network configuration information for the network may include, for each network element in a set of network elements of the network, at least one of location information for the respective network element or capacity information for the respective network element. The capacity information, for at least one network element in the set of network elements, may include, for each port in a set of ports of the respective network element, a port type of the respective port and a port speed of the respective port.

At block 320, determine, based on the set of network configuration information for the network, a network result for the network and a network intent for the network. The network result for the network and the network intent for the network may be based on at least one of a location parameter or a capacity parameter.

The network result for the network may be determined based on the network intent for the network. The determination of the network intent for the network may include determining, based on the set of network configuration information, a network intent type of the network intent, determining, based on the network intent type of the network intent, a set of network intent parameters for the network intent, and determining, for each of the network intent parameters in the set of network intent parameters based on the set of network configuration information, a respective potential value of the network intent parameter capable of being supported by the network. The determination of the network result for the network may include determining, for each of the network intent parameters in the set of network intent parameters based on the set of network configuration information, a respective actual value of the network intent parameter currently being supported by the network. The determination as to whether the network intent for the network is satisfied by the network may include comparing, for at least one of the network intent parameters in the set of network intent parameters, the respective potential value of the network intent parameter capable of being supported by the network and the respective actual value of the network intent parameter currently being supported by the network.

The network intent for the network may be determined based on the network result for the network. The determination of the network result for the network may include determining, based on the set of network configuration information, a set of network parameters for the network and determining, for each of the network parameters in the set of network parameters based on the set of network configuration information, a respective actual value of the network parameter currently being supported by the network. The determination of the network intent for the network may include determining, for each of the network parameters in the set of network parameters based on the set of network configuration information, a respective potential value of the network parameter capable of being supported by the network. The determination as to whether the network intent for the network is satisfied by the network may include comparing, for at least one of the network parameters in the set of network parameters, the respective actual value of the network parameter currently being supported by the network and the respective potential value of the network parameter capable of being supported by the network.

At block 330, determine, based on the network result for the network and the network intent for the network, whether the network intent for the network is satisfied by the network. The determination as to whether the network intent for the network is satisfied by the network may include comparing, for at least one of the network intent parameters in the set of network intent parameters, the respective potential value of the network intent parameter capable of being supported by the network and the respective actual value of the network intent parameter currently being supported by the network. The determination as to whether the network intent for the network is satisfied by the network may include comparing, for at least one of the network parameters in the set of network parameters, the respective actual value of the network parameter currently being supported by the network and the respective potential value of the network parameter capable of being supported by the network. The determination as to whether the network intent for the network is satisfied by the network may include comparing the network intent for the network and the network result for the network. The determination as to whether the network intent for the network is satisfied by the network, where the network intent for the network and network result for the network are based on a capacity parameter, may include determining whether a difference between a potential value of the capacity parameter for the network intent and an actual value of the capacity parameter for the network result satisfies a threshold.

At block 340, perform, based on whether the network intent for the network is satisfied by the network, a management action. The management action may include at least one of providing a notification to a customer of the network or reconfiguring the network. The management action, based on a determination that the network intent for the network is satisfied by the network, may include providing a notification to a customer of the network. The management action, based on a determination that the network intent for the network is not satisfied by the network, may include reconfiguring the network. The reconfiguring of the network may be based on a difference between the network intent for the network and the network result for the network.

At block 399, method 300 ends.

It will be appreciated that a brownfield deployment of a management system, configured to support management of a network based on IBN, may be supported in various other ways.

It will be appreciated that, although primarily described with respect to supporting brownfield deployment for using IBN at the network level, brownfield deployment also may be used at the service level for supporting brownfield deployment of services to a network (e.g., an existing network, a new network such as where the brownfield deployment includes both the network intents and associated service intents, or the like).

In at least some example embodiments, scalability of a management system, configured to support management of a network based on IBN, may be supported. Here, the management system may be MS 120 of FIG. 1, MS 200 of FIG. 2, or any other suitable management system or device. The management system may be configured to support scalability for use of IBN in the network based on use of a message bus configured to support scalable exchange of data between elements of the management system. The message bus may be configured to support a publisher-subscriber model for transfer of data between elements of the management system. For example, an inventory management element of the management system may publish inventory information for the network which may be subscribed to by other elements of the management system which may support handling of network intents based on such inventory information. For example, a network status information management element of the management system may publish network status information received from the network which may be subscribed to by other elements of management system which may support handling of network intents based on such network status information. It will be appreciated that the message bus may be configured to support exchanges of various other types of data, exchanges between various other elements of the management system, or the like, as well as various combinations thereof. The message bus may be configured to support a publisher-subscriber model for transfer of data between elements of the management system based on use of topics, where a topic may correspond to a type of information for which publication and subscription are supported (e.g., an inventory information topic or network status information topic in the examples provided above). The message bus may be configured to support a publisher-subscriber model for transfer of data between elements of the management system, based on use of topics, based on partitioning of topics (e.g., data items within the topic may be hashed into partitions and the number of partitions supported may be dynamically managed to support scalability). It will be appreciated that various aspects of supporting scalability for use of IBN may be further understood by way of reference to FIG. 4 and FIG. 5.

Figure 4:
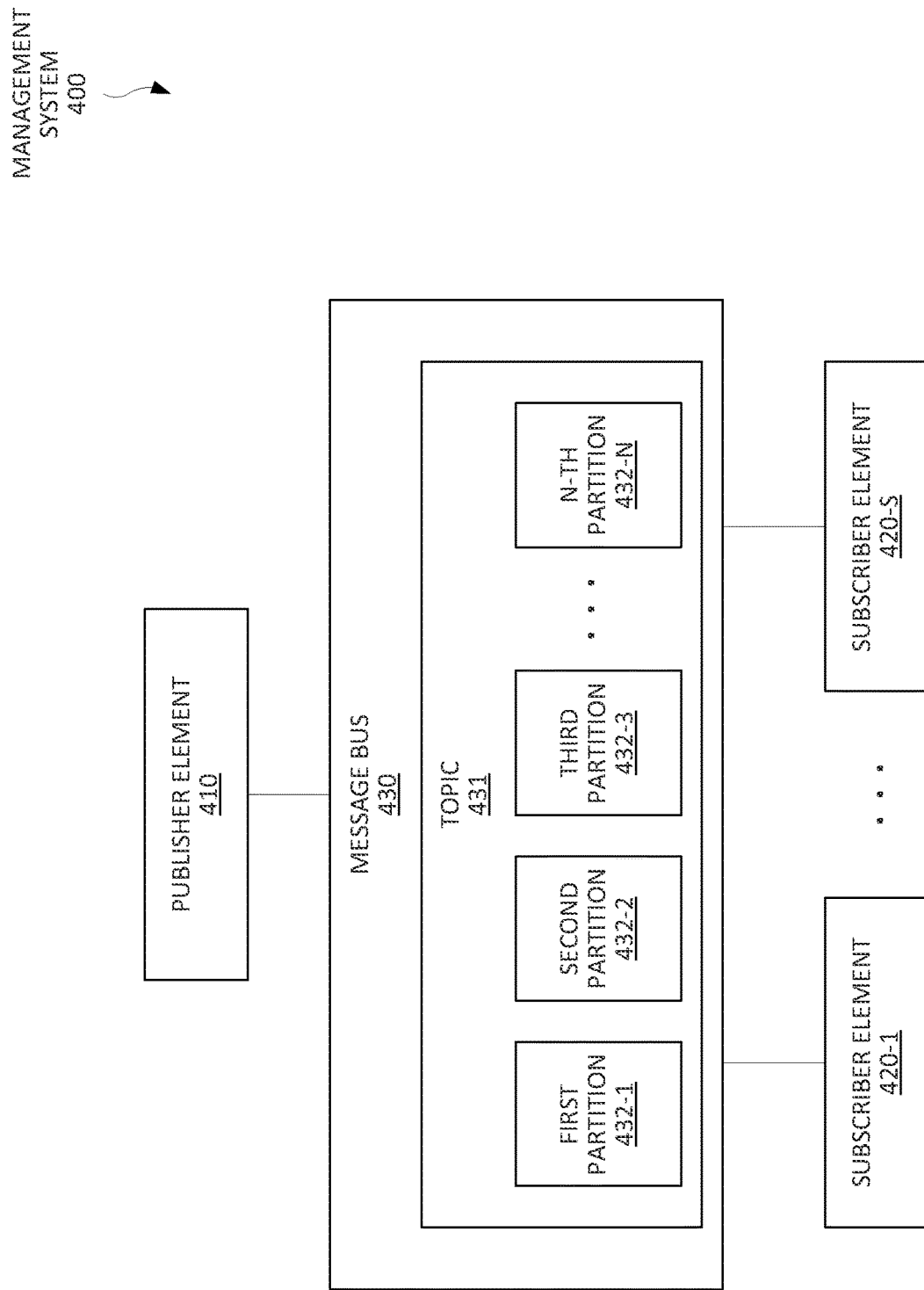
FIG. 4 depicts an example embodiment of a message bus configured to support scalability of a management system configured to support intent-based networking for a communication network.

FIG. 4 depicts an example embodiment of a message bus configured to support scalability of a management system configured to support intent-based networking for a communication network.

As depicted in FIG. 4, a management system (MS) 400 is configured to support exchanges of messages within the MS 400 using a publisher-subscriber model that is based on topics. The MS 400 includes a publisher element 410, a set of subscriber elements 420-1-420-S (collectively, subscriber elements 420), and a message bus 430 that is configured to support communication of data of a topic 431 from the publisher element 410 to the subscriber elements 420 using the publisher-subscriber model. The topic 431 may include any topic which may be supported by the management system 400 for supporting management of a communication network (e.g., inventory information, topology information, network element status information, or the like, as well as various combinations thereof). For example, the topic 431 may be inventory information for the equipment deployed in a communication network, in which case the publisher element 410 may be an inventory management element of the MS 400 that is the source of truth for the inventory information of the communication network and the subscriber elements 420 may be any elements of the MS 400 which may need access to inventory information for performing management functions for the communication network (e.g., an intent handling element configured to use inventory information for determining network configurations to satisfy intents, an intent validation element configured to use inventory information for validating that intents are still satisfied, a configuration management element configured to use inventory information to determine element-specific configurations for intents, or the like, as well as various combinations thereof). For example, the topic 431 may be topology information for a communication network, which may be exchanged and used in a manner similar to that described above for inventory information (e.g., the publisher element 410 may be a topology management element of the MS 400 that is the source of truth for the topology information of the communication network and the subscriber elements 420 may be any elements of the MS 400 which may need access to topology information for performing management functions for the communication network). It will be appreciated that various other topics may be published by various other elements of the MS 400 and subscribed to by various other elements of the MS 400 for enabling the MS 400 to support management of a communication network. It will be appreciated that, although primarily presented with respect to handling of a single topic (namely, topic 431) that is sourced by a single element of the MS 400 (namely, publisher element 410), the MS 400 may support exchanges of messages within the MS 400 for various topics which may be sourced by various elements of the MS 400.

The MS 400, as indicated above, is configured to support communication of data of the topic 431 from the publisher element 410 to the subscriber elements 420 using a publisher-subscriber model. The publisher element 410 is configured to publish data of the topic 431, and the message bus 430 subscribes to receive the data of the topic 431 that is published by the publisher element 410. The subscriber elements 420 are configured to subscribe to data of the topic 431, which is provided to the subscriber elements 420 by the message bus 430. In other words, the message bus 430 is configured to support handling of information exchanges for the topic 431, based on a publisher-subscriber model, for supporting delivery of data of the topic 431 from the publisher element 410 to the subscriber elements 420. The messages bus 430 is configured to support handling of information exchanges for the topic 431 based on a set of partitions for the topic 431 (illustratively, the message bus 430 includes a set of partitions 432 including a first partition 432-1, a second partition 432-2, a third partition 432-3, and so forth, up to an N-th partition 432-N). It will be appreciated that, although primarily presented with respect to use of the message bus 430 to handle data exchanges for a particular topic (namely, the topic 431), the message bus 430 may handle data exchanges for various other topics. It will be appreciated that the message bus 430 may handle data exchanges for other topics using partitioning for the topics. It will be appreciated that different topics may be handled by the message bus 430 using different numbers of partitions.

The message bus 430, as indicated above, is configured to support handling of information exchanges for the topic 431 based on the set of partitions 432 for the topic 431. The data of the topic 431 may be distributed across the partitions 432 based on hashing of one or more data fields included in each of the data items of the topic 431 which are maintained by the message bus 430 for the topic 431 using the set of partitions 432. The hashing of the one or more data fields of data items of the topic 431 to distribute the data items of the topic 431 across the partitions 432 may be based on any suitable hashing algorithm, such as one of the Secure Hash Algorithms (SHAs) (e.g., SHA-0, SHA-1, SHA-2, and SHA-3) or other suitable hashing algorithms. The one or more data fields of the data items of the topic 431 that are hashed may be selected in various ways and may vary (e.g., in terms of the numbers of data fields used as the basis for hashing, the specific data fields used as the basis for hashing, or the like, as well as various combinations thereof) for different topics. For example, where the topic 431 is inventory information for equipment in a communication network, and the data of the topic 431 includes a device identifier field identifying the device and a set of device capability, configuration, and status fields including information describing the capabilities, configuration, and current status of the device, respectively, the hashing of the data of the topic 431 may be based on the device identifier field in order to distribute the devices of the communication network across the partitions 432 in a manner that provides scalability to handling exchanges of inventory information between elements of the MS 400. For example, in a communication network including 500 devices, the message bus 430 may support ten partitions and the hashing on the device identifier may be performed in a manner enabling distribution of the handling of the inventory information for the 500 devices evenly, or nearly evenly, across the ten partitions such that each partition handles exchange of inventory information for about 50 of the 500 devices (e.g., data for devices 1-50 are handled by the first partition, data for devices 51-100 are handled by the second partition, and so forth, with data for devices 451-500 being handled by the tenth partition). It will be appreciated that various other numbers and types of data fields may be used as a basis for hashing to distribute data across partitions of a topic, various other numbers of partitions may be used, or the like, as well as various combinations thereof.

It will be appreciated that, although primarily presented with respect to partitioning being supported for a single topic, partitioning may be supported for multiple topics individually (e.g., each topic has its own set of partitions where various aspects of the partitioning (e.g., the number of partitions, the type of data used as the basis for hashing, the hash function used for hashing, or the like, as well as various combinations thereof) may vary across different topics), partitioning may be supported for multiple topics as a group (e.g., multiple topics may share a set of partitions, multiple sets of partitions supporting multiple topics may be supported, or the like, as well as various combinations thereof), or the like, as well as various combinations thereof.

FIG. 5 depicts an example embodiment of a method for use by a message bus configured to support scalability of a management system configured to support intent-based networking for a communication network. It will be appreciated that, although primarily presented as being performed serially, at least a portion of the functions of method 500 may be performed contemporaneously or in a different order than as presented with respect to FIG. 5.

At block 501, method 500 begins.

At block 510, receive, by a message bus of a management system from a first element of the management system, a set of data items of a topic. The first element of the management system may include an element configured to operate as a publisher in a publisher-subscriber model. The set of data items of the topic may be published by the first element of the management system. The first element of the management system may include an inventory management element or a topology management element.

At block 520, distribute, by the message bus across a set of partitions maintained by the message bus for the topic, the data items in the set of the data of the topic to maintain respective portions of the data items of the topic using the respective partitions maintained by the message bus for the topic. The data of the topic may be distributed across the set of partitions based on hashing of at least one data field in each of the data items in the set of data items of the topic. The hashing of the at least one data field in each of the data items in the set of data items may be based on a hash function. The at least one data field may include a device identifier field. The data items in the set of data items may correspond to a respective set of network elements of a network, and a new network element of the network may become manageable through the set of partitions maintained by the message bus for the topic based on a determination that a status of the network element satisfies a condition. The message bus may add a new partition to the set of partitions maintained by the message bus for the topic based on a detection of a condition. The message bus may remove one of the partitions in the set of partitions based on a detection of a condition. The message bus may maintain, for a second topic, a second set of partitions configured to maintain respective portions of data of the second topic.

At block 530, send, by the message bus toward a second element of the management system based on the set of partitions maintained by the message bus for the topic, the data items of the topic. The second element of the management system may include an element configured to operate as a subscriber in a publisher-subscriber model. The second element of the management system may be included in a list of subscribers to the topic, such as where the message bus receives a request by the second element of the management system to subscribe to the topic and includes the second element of the management system in the list of subscribers to the topic based on the request by the second element of the management system to subscribe to the topic. The message bus may be configured to provide the data items of the topic to the second element of the management system based on inclusion of the second element of the management system in the list of subscribers to the topic. The second element of the management system may include an intent management element, an intent validation element, or a configuration management element.

At block 599, method 500 ends.

It will be appreciated that scalability of a management system, configured to support management of a network based on IBN, may be supported in various other ways.

In at least some example embodiments, redundancy of a management system, configured to support management of a network based on IBN, may be supported.

The management system may be configured to support redundancy for use of IBN in the network. Here, the management system may be MS 120 of FIG. 1, MS 200 of FIG. 2, or any other suitable management system or device. The management system may be configured to support redundancy for use of IBN in the network based on use of a pair of instances of the management system. For example, where a customer operates two DCs, one on the east coast of the United States and the other on the west coast of the United States, the customer may use a first instance of the management system to manage the first DC on the east coast and a second instance of the management system to manage the second DC on the west coast. It will be appreciated that, although primarily described as being separate instances of the same management system, in some cases the management of the two DCs may be performed using two separate management systems. The management system may be configured to support redundancy for use of IBN in the network based on use of a pair of message buses associated with the pair of instances of the management system. The pair of messages buses associated with the pair of instances of the management system may support bidirectional mirroring of data between the two message buses, bidirectional health monitoring between the two message buses, and failover and recovery handling by the two message buses, for supporting redundancy of the message bus functions of the pair of message buses associated with the pair of instances of the management system. In one example, for a given topic supported by the two message buses, bidirectional mirroring of data between the two message buses may be provided as follows: (1) the first message bus is a publisher to the second message bus which is then a subscriber for the data of the topic received by the first message bus from an element publishing the data to the first message bus on the first instance of the management system and (2) the second message bus is a publisher to the first message bus which is then a subscriber for the data of the topic received by the second message bus from an element publishing the data to the second message bus on the second instance of the management system. In one example, bidirectional health monitoring between the two message buses, which allows either of the message buses to detect unavailability of the other of the message buses (e.g., the associated instance of the management system fails), may be based on sending of and monitoring for heartbeat messages between the message buses. In one example, failover handling by the message buses may be performed such that, if either message bus becomes unavailable, then the active message bus can support subscribers from both instances of the management system based on partition management within the topic by the active message bus (e.g., using one set of partitions within the topic for subscribers from the instance of the management system with which the active message bus is associated and a second set of partitions within the topic for subscribers from the instance of the management system with which the unavailable message bus is associated). It will be appreciated that various aspects of supporting redundancy for use of IBN may be further understood by way of reference to FIGS. 6A-6C, FIG. 7, and FIG. 8.

Figure 6A:
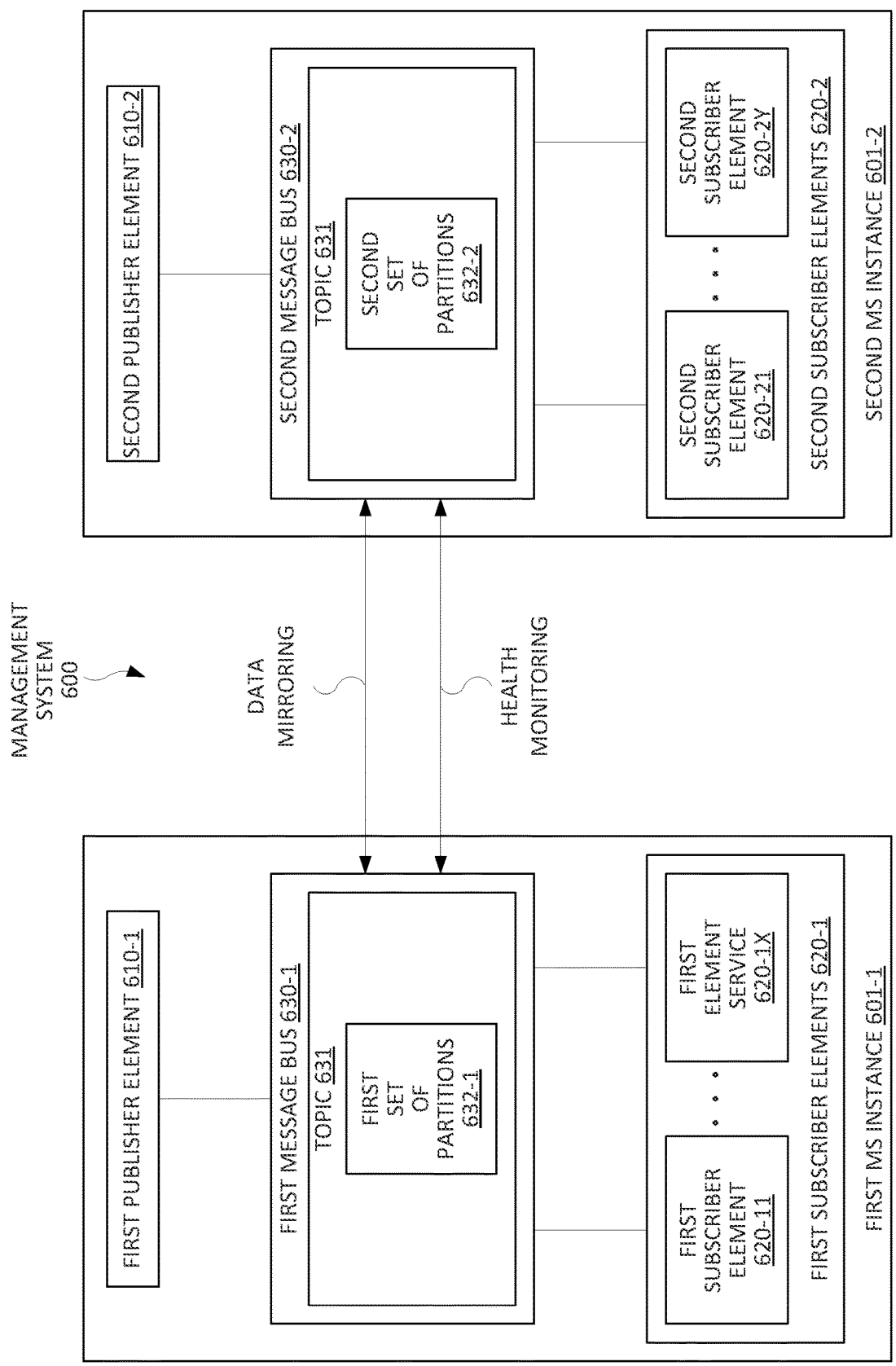
FIGS. 6A-6C depict an example embodiment of a pair of message buses configured to support redundancy of a management system configured to support intent-based networking for a communication network.
Figure 6B:
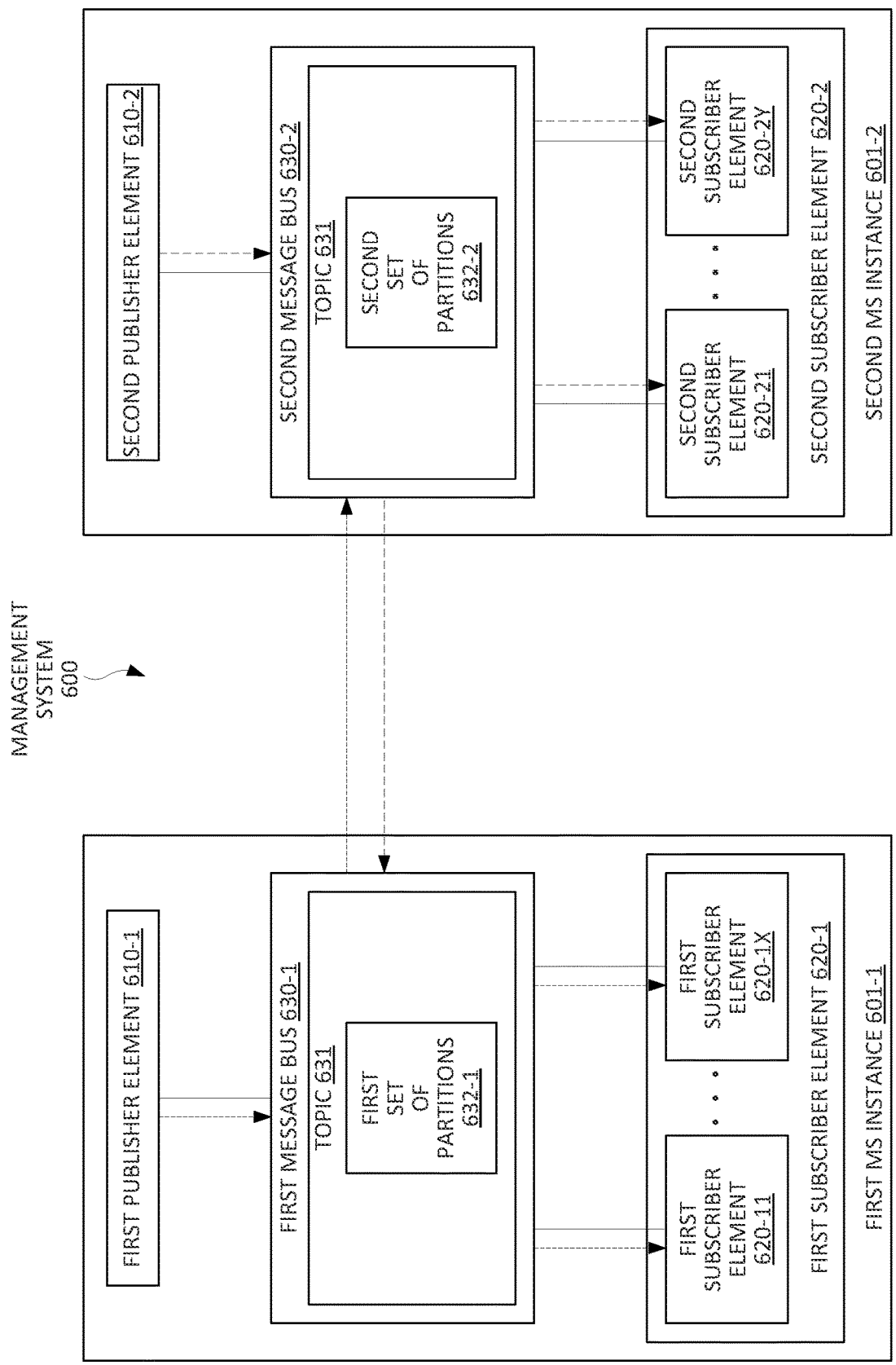
Figure 6C:
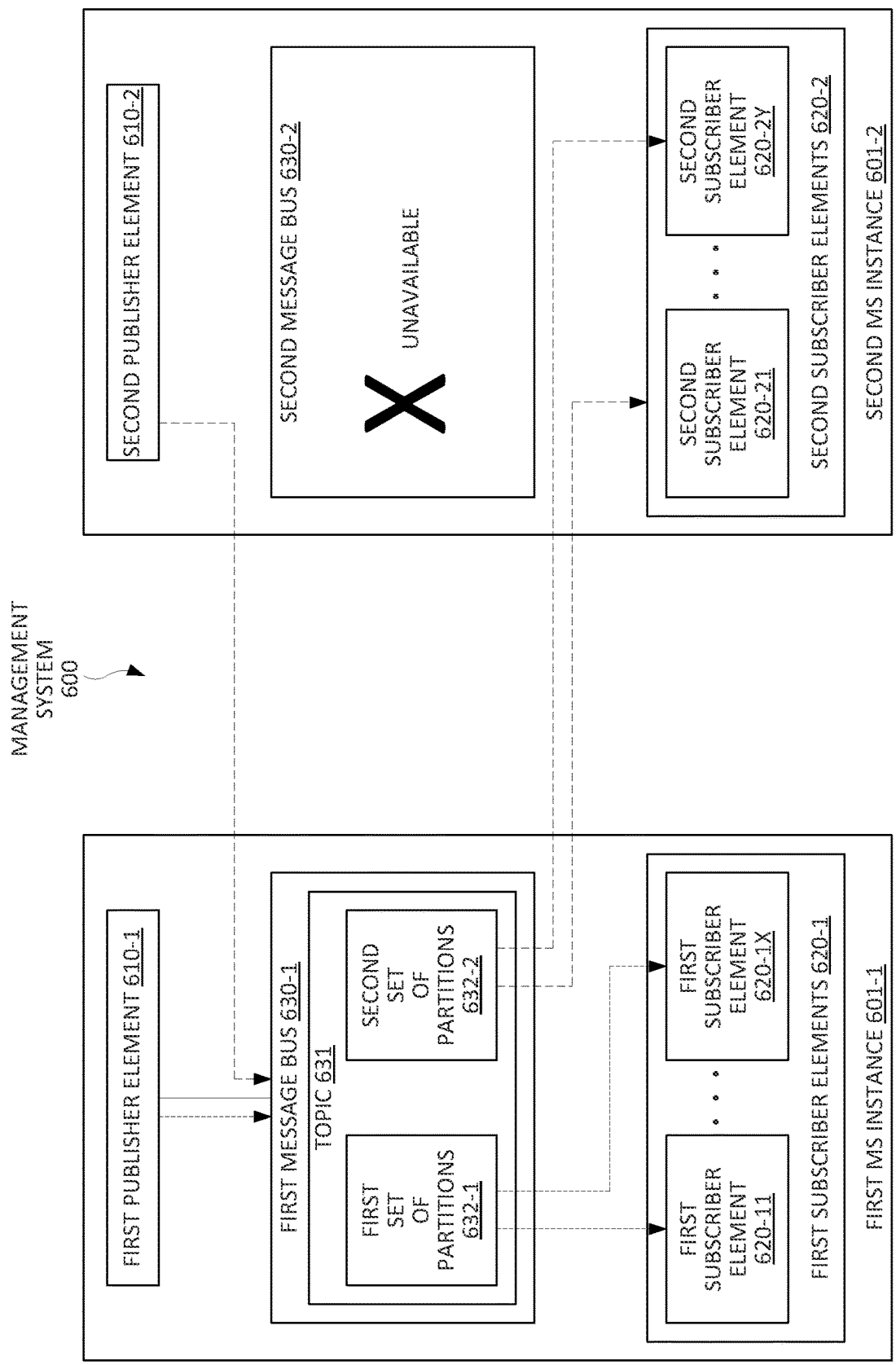

FIGS. 6A-6C depict an example embodiment of a pair of message buses configured to support redundancy of a management system configured to support intent-based networking for a communication network.

As depicted in FIG. 6A, a management system (MS) 600 includes a first MS instance 601-1 and a second MS instance 601-2 (collectively, MS instances 601). The MS instances 601 may correspond to different instances managing different portions of an overall network of a network provider (e.g., for a DC, a first portion of the DC in New York and a second portion of the DC in California), different instances managing different networks of a network provider (e.g., a first DC in New York and a second DC in California), or the like. It will be appreciated that the MS instances 601 may be applied for network management in various other ways.

As depicted in FIG. 6A, the first MS instance 601-1 includes a first publisher element 610-1, a set of first subscriber element 620-11-620-1X (collectively, first subscriber elements 620-1), and a first message bus 630-1, and, similarly, the second MS instance 601-2 includes a second publisher element 610-2, a set of second subscriber elements 620-21-620-2Y (collectively, second subscriber elements 620-2), and a second message bus 630-2. It will be appreciated that the first publisher element 610-1 and the second publisher element 610-2 may be referred to collectively as publisher elements 610, the first subscriber elements 620-1 and the second subscriber elements may be referred to collectively as subscriber elements 620, and the first message bus 630-1 and the second message bus 630-2 may be referred to collectively as message buses 630.

As depicted in FIG. 6A, the message buses 630 are configured to support handling of information exchanges for a topic 631. The messages buses 630 are configured to support handling of information exchanges for the topic 631 based on a publisher-subscriber model. The messages buses 630 are configured to support handling of information exchanges for the topic 631 based on sets of partitions for the topic 631 (illustratively, the first message bus 630-1 supports a first set of partitions 632-1 and the second message bus 630-2 supports a second set of partitions 632-2, which may be referred to collectively as a set of partitions 632). It will be appreciated that, although primarily presented with respect to use of the message buses 630 of the MS instances 601 to handle data exchanges for a particular topic (namely, topic 631), the message buses of the MS instances 601 also may handle data exchanges for various other topics.

As depicted in FIG. 6A, the message buses 630 are configured to support redundancy for the MS 600. The message buses 630 are configured to support redundancy for the MS 600 based on use of bidirectional data mirroring and bidirectional health monitoring, each of which is further presented with respect to FIG. 6B and FIG. 6C.

As depicted in FIG. 6B, the message buses 630 are configured to support redundancy for the MS 600. The redundancy may be physical redundancy (e.g., where the MS instances 601 provide physical redundancy for a single network location, such as a single DC network located in New York), geographic redundancy (e.g., where the MS instances 601 provide geographic redundancy for two network locations, such as a first DC network located in New York that is primarily managed by the first MS instance 601-1 and a second DC network located in Los Angeles that is primarily managed by the second MS instance 601-2), or the like, as well as various combinations thereof. The message buses 630 may be configured to support redundancy based on data mirroring in which the first message bus 630-1 mirrors data to the second message bus 630-2 (such that the second message bus 630-2 is able to take over message bus functions of the first message bus 630-1 when the first message bus 630-1 is unavailable) and the second message bus 630-2 mirrors data to the first message bus 630-1 (such that the first message bus 630-1 is able to take over message bus functions of the second message bus 630-2 when the second message bus 630-2 is unavailable).

As depicted in FIG. 6B, the message buses 630 are configured to support redundancy for the IBN of the MS 600 based on use of bidirectional data mirroring.

The first message bus 630-1 is configured to support a publisher-subscriber model in which the first message bus 630-1 receives data of the topic 631 from the first publisher element 610-1 and stores the data such that the data of the topic 631 may be provided to subscribers to the topic 631 which, here, include the first subscriber elements 610-1 as well as the second message bus 630-2 based on mirroring of the data of the topic 631 to the second message bus 630-2. This enables the second message bus 630-2 to maintain a current view of the data of the topic 631 that is maintained by the first message bus 630-1 and, thus, to be able to provide the data of the topic 631 to the first subscriber elements 630-1 of the first MS instance 601-1 when the first message bus 630-1 is unavailable.

The second message bus 630-2 is configured to support a publisher-subscriber model in which the second message bus 630-2 receives data of the topic 631 from the second publisher element 610-2 and stores the data such that the data of the topic 631 may be provided to subscribers to the topic 631 which, here, include the second subscriber elements 610-2 as well as the first message bus 630-1 based on mirroring of the data of the topic 631 to the first message bus 630-1. This enables the first message bus 630-1 to maintain a current view of the data of the topic 631 that is maintained by the second message bus 630-2 and, thus, to be able to provide the data of the topic 631 to the second subscriber elements 630-2 of the second MS instance 601-2 when the second message bus 630-2 is unavailable.

As depicted in FIG. 6B, the message buses 630 are configured to support redundancy for the IBN of the MS 600 based on use of health monitoring. The health monitoring may be performed using periodic heartbeat messages exchanged between the first message bus 630-1 and the second message bus 630-2. The first message bus 630-1 may periodically send heartbeat messages to the second message bus 630-2 and may monitor for receipt of periodic heartbeat messages from the second message bus 630-2 and, similarly, the second message bus 630-2 may periodically send heartbeat messages to the first message bus 630-1 and may monitor for receipt of periodic heartbeat messages from the first message bus 630-1. It will be appreciated that the heartbeat messages may be provided using any suitable protocol.

As depicted in FIG. 6C, the message buses 630 are configured to support redundancy for the IBN of the MS 600 based on use of failover handling.

As depicted in FIG. 6C, the first message bus 630-1, based on a determination that the second message bus 630-2 of the second MS instance 601-2 is unavailable (e.g., a heartbeat message is not received from the second message bus 630-2 when expected), takes over handling of data of the topic 631 that was previously being handled by the second message bus 630-2. The first message bus 630-1, if not already a subscriber to the second publisher element 610-2 of the second MS instance 601-2, subscribes to second publisher element 610-2 of the second MS instance 601-2 to receive the data of the topic 631 that is being published by the second publisher element 610-2 of the second MS instance 601-2. The first message bus 630-1 may store the data of the topic 631 and control distribution of the data of the topic 631 based on the set of partitions 632 that includes the first set of partitions 632-1 for the data of the topic 631 published by the first publisher element 610-1 of the first MS instance 601-1 and the second set of partitions 632-2 for the data of the topic 631 published by the second publisher element 610-2 of the second MS instance 601-2. The first message bus 630-1 may create the second set of partitions 632-2 for the data of the topic 631 published by the second publisher element 610-2 of the second MS instance 601-2 based on learning of the second set of partitions 632-2 for the data of the topic 631 from the second MS instance 601-2 or by creating non-overlapping partitions which do not overlap with the first set of partitions 632-1 for the data of the topic 631 which are supported by the first message bus 630-1 for handling the data of the topic 631 that is published by the first publisher element 610-1 of the first MS instance 601-1. The second subscriber elements 620-2 of the second MS instance 601-2 may then receive data of the topic 631 from the second set of partitions 632-2, which are now supported by the first message bus 630-1 rather than the second message bus 630-2, while the second message bus 630-2 of the second MS instance 601-2 is unavailable. The second message bus 630-2 eventually becomes available again and the first message bus 630-1 detects the availability of the second message bus 630-2 (e.g., a new heartbeat message is received from the second message bus 630-2). The second message bus 630-2 is synchronized with the second publisher element 610-2 of the second MS instance 601-2 for the topic 631 and then resumes distribution of the data of the topic 631 to the second subscriber elements 620-2 of the second MS instance 601-2.

Similarly, although not depicted in FIG. 6C, the second message bus 630-2, based on a determination that the first message bus 630-1 of the first MS instance 601-1 is unavailable (e.g., a heartbeat message is not received from the first message bus 630-1 when expected), takes over handling of data of the topic 631 that was previously being handled by the first message bus 630-1. The second message bus 630-2, if not already a subscriber to the first publisher element 610-1 of the first MS instance 601-1, subscribes to first publisher element 610-1 of the first MS instance 601-1 to receive the data of the topic 631 that is being published by the first publisher element 610-1 of the first MS instance 601-1. The second message bus 630-2 may store the data of the topic 631 and control distribution of the data of the topic 631 based on the set of partitions 632 that includes the second set of partitions 632-2 for the data of the topic 631 published by the second publisher element 610-2 of the second MS instance 601-2 and the first set of partitions 632-1 for the data of the topic 631 published by the first publisher element 610-1 of the first MS instance 601-1. The second message bus 630-2 may create the first set of partitions 632-1 for the data of the topic 631 published by the first publisher element 610-1 of the first MS instance 601-1 based on learning of the first set of partitions 632-1 for the data of the topic 631 from the first MS instance 601-1 or by creating non-overlapping partitions which do not overlap with the second set of partitions 632-2 for the data of the topic 631 which are supported by the second message bus 630-2 for handling the data of the topic 631 that is published by the second publisher element 610-2 of the second MS instance 601-2. The first subscriber elements 620-1 of the first MS instance 601-1 may then receive data of the topic 631 from the first set of partitions 632-1, which are now supported by the second message bus 630-2 rather than the first message bus 630-1, while the first message bus 630-1 of the first MS instance 601-1 is unavailable. The first message bus 630-1 eventually becomes available again and the second message bus 630-2 detects the availability of the first message bus 630-1 (e.g., a new heartbeat message is received from the first message bus 630-1). The first message bus 630-1 is synchronized with the first publisher element 610-1 of the first MS instance 601-1 for the topic 631 and then resumes distribution of the data of the topic 631 to the first subscriber elements 620-1 of the first MS instance 601-1.

It will be appreciated that, although primary presented with respect to example embodiments in which redundancy is bidirectional (e.g., based on bidirectional data mirroring, bidirectional health monitoring, or the like), in at least some example embodiments the redundancy may be unidirectional (e.g., only the second MS instance 601-2 protects the first MS instance 601-1 of the MS 600 or only the first MS instance 601-1 protects the second MS instance 601-2 of the MS 600).

Figure 7:
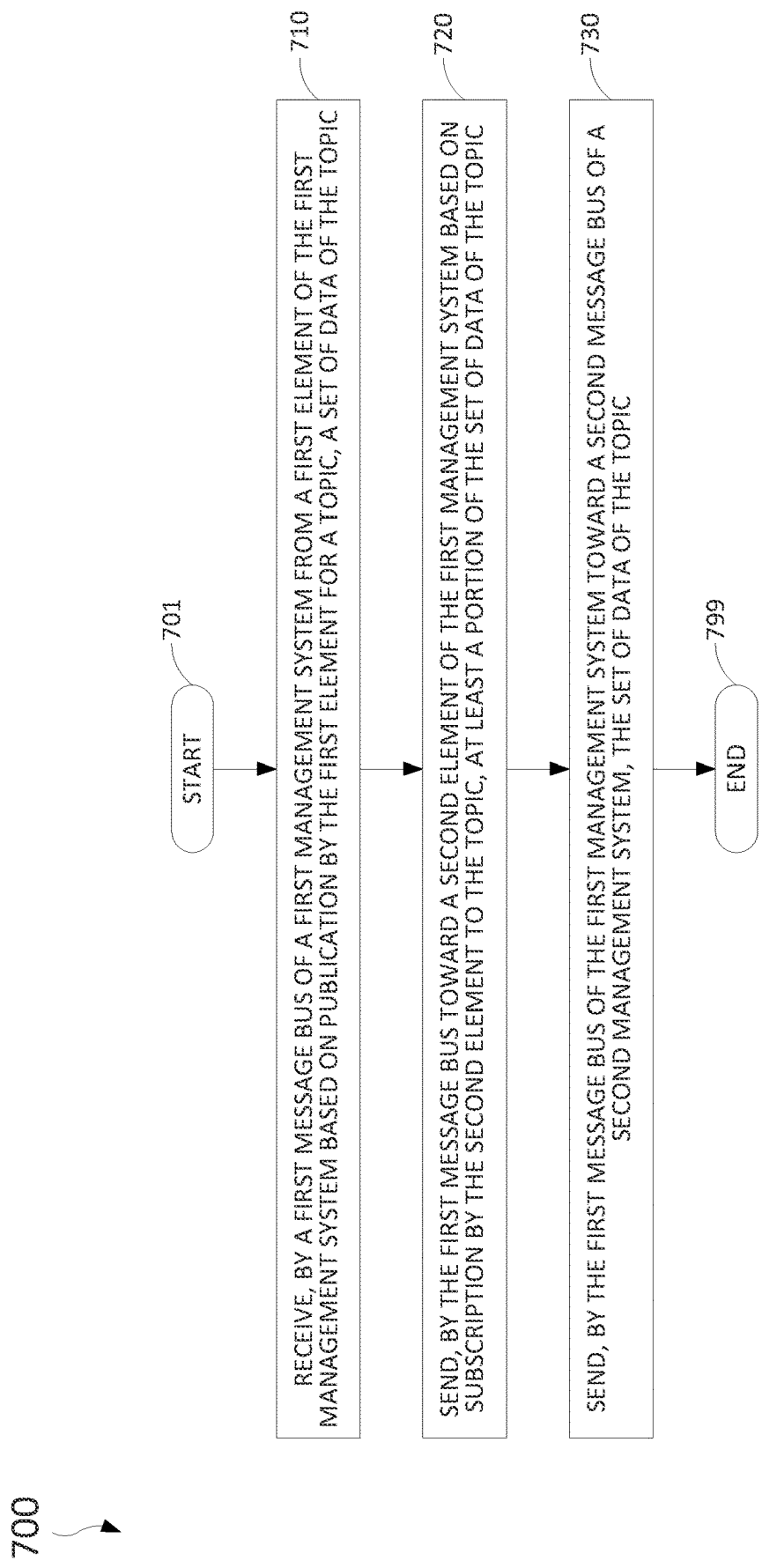
FIG. 7 depicts an example embodiment of a method for use by a message bus configured to support redundancy of a management system configured to support intent-based networking for a communication network.

FIG. 7 depicts an example embodiment of a method for use by a message bus configured to support redundancy of a management system configured to support intent-based networking for a communication network. It will be appreciated that, although primarily presented as being performed serially, at least a portion of the functions of method 700 may be performed contemporaneously or in a different order than as presented with respect to FIG. 7.

At block 701, method 700 begins.

At block 710, receive, by a first message bus of a first management system from a first element of the first management system based on publication by the first element for a topic, a set of data of the topic. The first message bus may store the set of data of the topic based on a set of partitions maintained by the first message bus for the topic.

At block 720, send, by the first message bus toward a second element of the first management system based on subscription by the second element to the topic, at least a portion of the set of data of the topic. The set of data of the topic may be sent toward the second element of the first management system using a set of partitions maintained by the first message bus for the topic.

At block 730, send, by the first message bus of the first management system toward a second message bus of a second management system, the set of data of the topic. The set of data of the topic may be sent toward the second message bus based on a subscription by the second message bus to the topic at the first message bus. The set of data of the topic may be sent toward the second message bus using a set of partitions maintained by the first message bus for the topic.

At block 799, the method 700 ends.

It will be appreciated that various other functions presented with respect to FIGS. 6A-6C may be provided within the context of method 700 of FIG. 7. For example, the first message bus may send, toward the second message bus, a heartbeat message configured to indicate to the second message bus that the first message bus is active. For example, the first message bus may monitor for receipt of a heartbeat message configured to indicate to the first message bus that the second message bus is active. For example, the first message bus may detect, based on a determination that the heartbeat message has not been received, that the second message bus is unavailable and send, toward an element of the second management system based on a subscription by the element of the second management system to the topic at the first message bus, the set of data of the topic. For example, the first management system and the second management system may be respective instances of a management system. It will be appreciated that various other functions presented with respect to FIGS. 6A-6C may be provided within the context of method 700 of FIG. 7.

Figure 8:
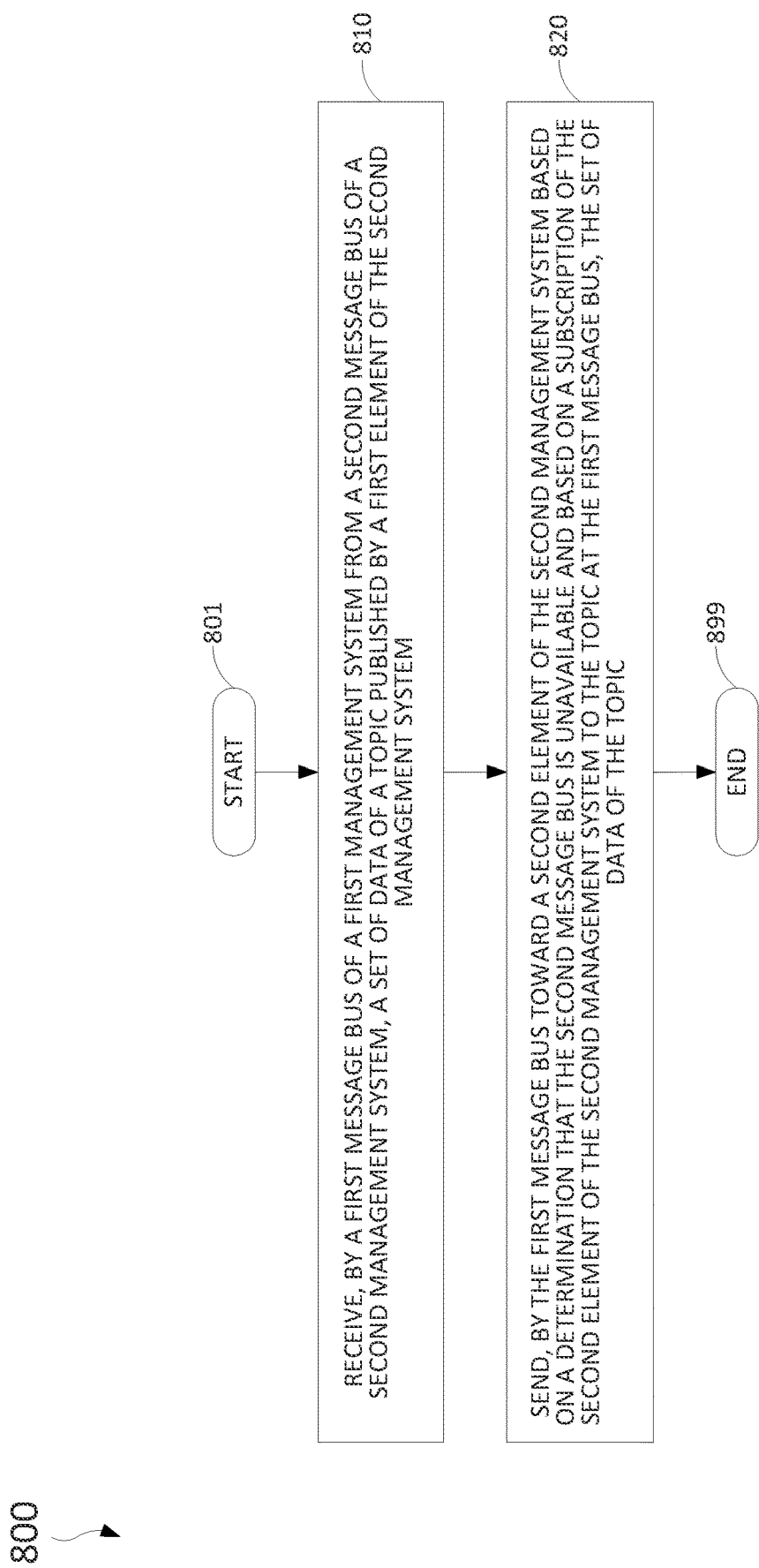
FIG. 8 depicts an example embodiment of a method for use by a message bus configured to support redundancy of a management system configured to support intent-based networking for a communication network.

FIG. 8 depicts an example embodiment of a method for use by a message bus configured to support redundancy of a management system configured to support intent-based networking for a communication network. It will be appreciated that, although primarily presented as being performed serially, at least a portion of the functions of method 800 may be performed contemporaneously or in a different order than as presented with respect to FIG. 8.

At block 801, method 800 begins.

At block 810, receive, by a first message bus of a first management system from a second message bus of a second management system, a set of data of a topic published by a first element of the second management system. The first message bus may maintain the set of data of the topic based on a set of partitions maintained by the first message bus for the topic. The set of partitions may be learned by the first message bus from the second message bus. The first message bus may maintain, based on a set of partitions maintained by the first message bus for the topic, the set of data of the topic.

At block 820, send, by the first message bus toward a second element of the second management system based on a determination that the second message bus is unavailable and based on a subscription of the second element of the second management system to the topic at the first message bus, the set of data of the topic. The determination that the second message bus is unavailable may be based on a detection by the first message bus of a failure to receive, from the second message bus, a heartbeat message configured to indicate to the first message bus that the second message bus is active.

At block 899, method 800 ends.

It will be appreciated that various other functions presented with respect to FIGS. 6A-6C may be provided within the context of method 800 of FIG. 8. For example, the first message bus may receive, from a first element of the first management system, a second set of data of the topic published by the first element of the first management system. For example, the first message bus may send, toward a second element of the first management system based on a subscription by the second element of the first management system to the topic at the first message bus, the second set of data of the topic. For example, the first message bus may maintain, based on a set of partitions maintained by the first message bus for the topic, the set of data of the topic and the second set of data of the topic. For example, the set of data of the topic may be maintained using a first group of partitions from the set of partitions and the second set of data of the topic may be maintained using a second group of partitions from the set of partitions, where the first group of partitions and the second group of partitions are non-overlapping. For example, the first management system and the second management system may be respective instances of a management system. It will be appreciated that various other functions presented with respect to FIGS. 6A-6C may be provided within the context of method 800 of FIG. 8.

It will be appreciated that redundancy of a management system, configured to support management of a network based on IBN, may be supported in various other ways.

In at least some example embodiments, change management by a management system, configured to support management of a network based on IBN, may be supported.

The management system may be configured to support changes to the network. For example, a customer may wish to make changes to network configurations, service configurations, or the like, as well as various combinations thereof. The management system may be configured to support changes to the network based on validation of the changes to the network, where the changes may be validated after being implemented within the network (e.g., if the changes are validated then the changes may be retained, otherwise the changes may be reversed based on a determination that the changes cannot be validated) or may be validated before being implemented within the network (e.g., if the changes are validated then the changes may be implemented within the network, otherwise the changes may be prevented from being implemented within the network based on a determination that the changes cannot be validated). The management system may be configured to support changes to the network, based on validation of the changes to the network after the changes are effected in the network, by receiving a request for a network change, executing the network change in the network, receiving status information from one or more network elements of the network (e.g., based on use of telemetry for controlling reporting of status information from network elements of the network), determining, based on the status information, a result of execution of the network change on the network (e.g., whether one or more intents are still satisfied after the network change), and performing one or more management actions based on the result of execution of the change on the network (e.g., notifying the customer of the result of the change, performing reconfiguration of the network to remove the change, or the like, as well as various combinations thereof). The management system may be configured to support changes to the network, based on validation of the changes to the network before the changes are effected in the network, by receiving a request for a change, executing the change in a representative network configured to represent the network, receiving status information from one or more network elements of the representative network configured to represent the network (e.g., based on use of telemetry for controlling reporting of status information from network elements of the representative network configured to represent the network), determining, based on the status information from network elements of the representative network configured to represent the network, an expected result of execution of the change on the network, and performing one or more management actions based on the expected result of execution of the change on the network (e.g., notifying the customer of the result of the change, performing reconfiguration of the network to implement the change within the network, or the like, as well as various combinations thereof). It will be appreciated that the representative network configured to represent the network is a network that is configured to mirror the network such that execution of changes in the representative network configured to represent the network will provide an indication as to the effect of those changes if executed in the network, such as a replica or near replica of the network (e.g., a physical network that is configured to mirror network, a virtual network that is configured to mirror the network, a sandbox network configured to mirror, or emulate, the network (which itself may be a physical network, virtual network, or a combination thereof), or the like, as well as various combinations thereof.

Figure 9:
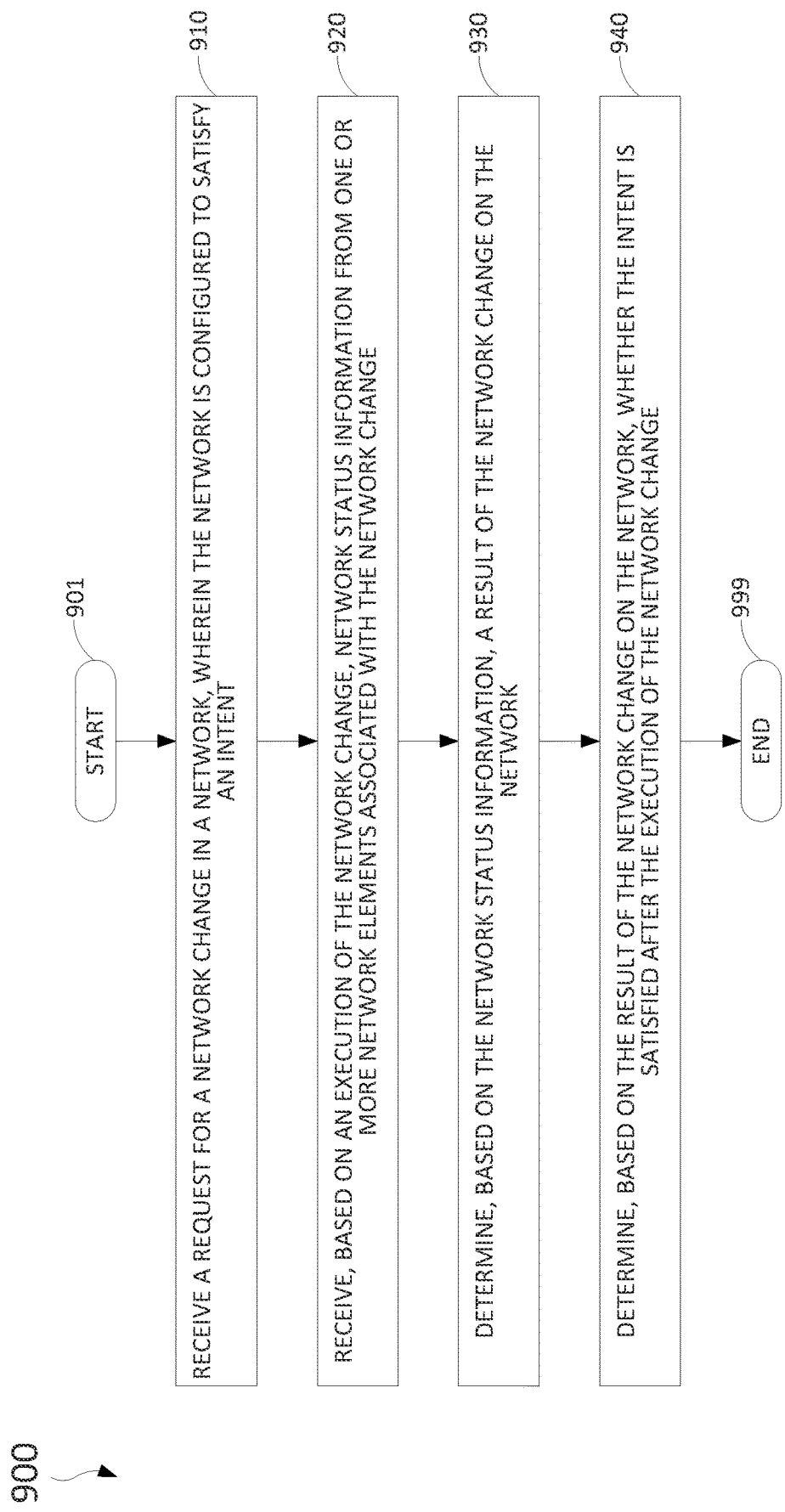
FIG. 9 depicts an example embodiment of a method for use by a management system, configured to support intent-based networking for a communication network, to perform change management for the communication network.

It will be appreciated that various aspects of supporting changes to a network based on use of IBN may be further understood by way of reference to FIG. 9.

FIG. 9 depicts an example embodiment of a method for use by a management system, configured to support intent-based networking for a communication network, to perform change management for the communication network. It will be appreciated that, although primarily presented as being performed serially, at least a portion of the functions of method 900 may be performed contemporaneously or in a different order than as presented with respect to FIG. 9.

At block 901, method 900 begins.

At block 910, receive a request for a network change in a network, wherein the network is configured to satisfy an intent. The intent may include at least one of a network intent or a service intent.

At block 920, receive, based on an execution of the network change, network status information from one or more network elements associated with the network change. The network change may be executed in the network with the network elements being part of the network. The network change may be executed in a sandbox network with the network elements being part of the sandbox network. The sandbox network may be a physical representation of the network or a virtual representation of the network. The network status information, or at least a portion thereof, may be received based on a telemetry capability of at least one of the one or more network elements.

At block 930, determine, based on the network status information, a result of the network change on the network. The determination of the result of the change on the network may include determining, based on the intent, an intent parameter and determining, based on the network status information, a value of the intent parameter. The determination of the result of the change on the network may include determining, based on the intent, an intent parameter, determining, based on the network status information, a value of the intent parameter for the network change, and determining, based on the value of the intent parameter for the change, a value of the intent parameter for the intent.

At block 940, determine, based on the result of the network change on the network, whether the intent is satisfied after the execution of the network change. The determination as to whether the intent is satisfied after the execution of the network change may include determining, based on the intent, an intent parameter of the intent and an intent value of the intent parameter, determining, based on the result of the network change on the network, a new value of the intent parameter, and determining, based on the intent value of the intent parameter and the new value of the intent parameter, whether the intent is satisfied after the execution of the network change.

At block 999, method 900 ends.

It will be appreciated that method 900 of FIG. 9 may support execution of various other functions, at least some of which, as discussed further below, may depend on whether the network change is evaluated within the network itself or within a representation of the network (e.g., a physical replica, a virtual replica, a sandbox network, or the like).

In at least some example embodiments, the network change is executed within the network. Here, the method may include sending, toward a device of a user, an indication as to whether the network still satisfies the intent. Here, the method may further include receiving, from the device of the user, a request to undo the network change from the network and initiating one or more configuration actions configured to undo the network change from the network. It will be appreciated that various other functions may be performed within the context of method 900 of FIG. 9 when the network change is executed within the network.

In at least some example embodiments, the network change is executed within a sandbox network configured to emulate the network. Here, the method may include sending, toward a device of a user, an indication that execution of the network change within the network will cause the network intent to no longer be satisfied by the network. Here, the method may include sending, toward a device of a user, an indication that execution of the network change within the network will result in the network intent continuing to be satisfied by the network. The method may further include receiving, from the device of the user, a request to apply the network change in the network and initiating one or more configuration actions configured to apply the network change in the network. It will be appreciated that various other functions may be performed within the context of method 900 of FIG. 9 when the network change is executed within a sandbox network configured to emulate the network.

It will be appreciated that method 900 of FIG. 9 may support execution of various other functions.

It will be appreciated that change management by a management system, configured to support management of a network based on IBN, may be supported in various other ways.

Various example embodiments for supporting management of a network based on IBN may provide various advantages or potential advantages. For example, various example embodiments for supporting management of a network based on IBN may be configured to support a management system configured to support various network deployment scenarios, including greenfield deployment scenarios for enabling customers to deploy and activate new networks, brownfield deployment scenarios for enabling customers to apply IBN to existing networks based on intelligent reconstruction of the original intent(s) of the network and configuration of the network to ensure satisfaction of the original intent(s) of the network, or the like, as well as various combinations thereof. For example, various example embodiments for supporting management of a network based on IBN may be configured to support a management system configured to support management of a network based on use of scalability for management of the network where the scalability is based on use of partitioning of topics in a publisher-subscriber model used for exchange of information between elements of the management system supporting management of the network based on IBN. For example, various example embodiments for supporting management of a network based on IBN may be configured to support a management system configured to support management of a network based on use of redundancy for management of the network where the redundancy is based on use of mirroring of message buses associated with instances of the management system, thereby enabling an active message bus to take over handling of data exchanges for a topic previously handled by an unavailable message bus that became unavailable to handle data exchanges for the topic. For example, various example embodiments for supporting management of a network based on IBN may be configured to support a management system configured to support management of a network based on use of change management for management of the network where the change management is based on validation of changes in the network before the changes are permanently effected in the network (e.g., based on application of the changes in the network for validation of the changes, based on application of the changes in a network that mirrors the real network before applying the changes to the real network, or the like). Various example embodiments for supporting management of a network based on IBN may provide various other advantages or potential advantages.

Figure 10:
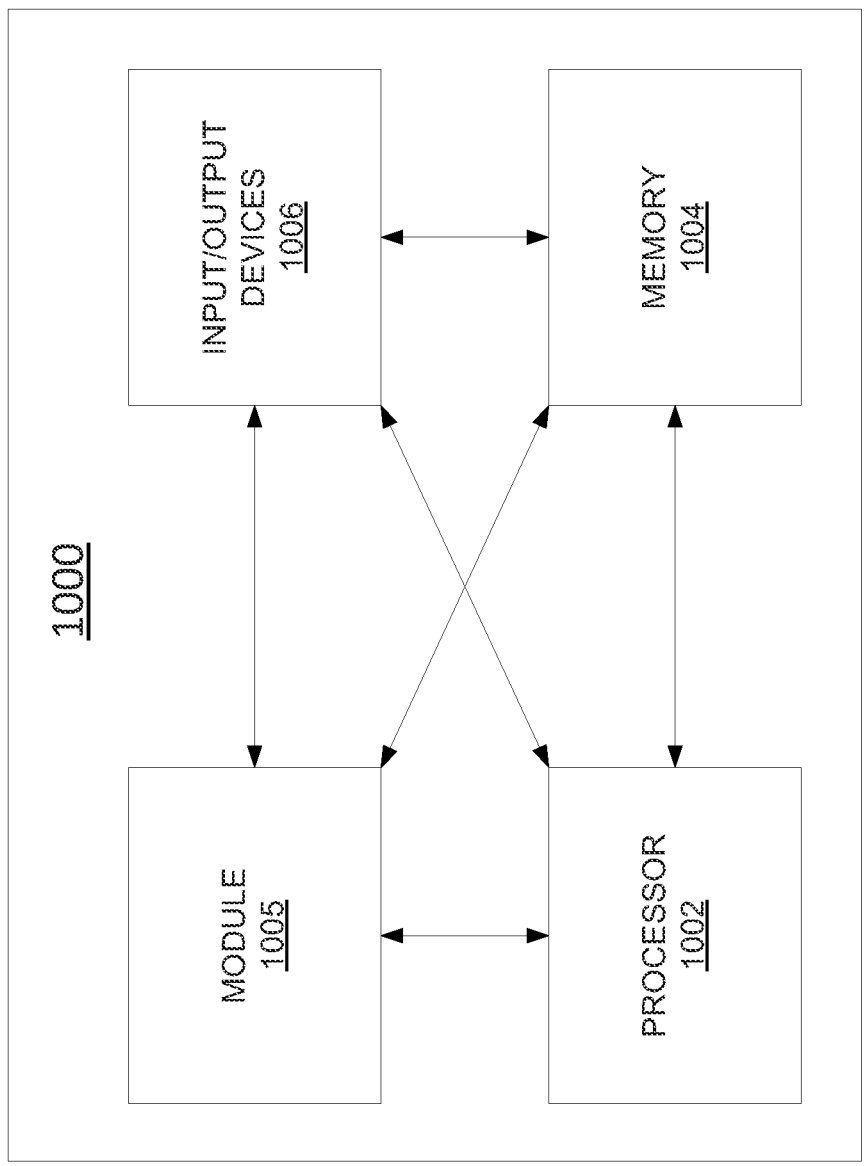
FIG. 10 depicts an example embodiment of a computer suitable for use in performing various functions presented herein.

FIG. 10 depicts an example embodiment of a computer suitable for use in performing various functions presented herein.

The computer 1000 includes a processor 1002 (e.g., a central processing unit (CPU), a processor, a processor having a set of processor cores, a processor core of a processor, or the like) and a memory 1004 (e.g., a random access memory, a read only memory, or the like). The processor 1002 and the memory 1004 may be communicatively connected. In at least some example embodiments, the computer 1000 may include at least one processor and at least one memory including computer program code, wherein the at least one memory and the computer program code are configured to, with the at least one processor, cause the computer to perform various functions presented herein.

The computer 1000 also may include a cooperating element 1005. The cooperating element 1005 may be a hardware device. The cooperating element 1005 may be a process that can be loaded into the memory 1004 and executed by the processor 1002 to implement various functions presented herein (in which case, for example, the cooperating element 1005 (including associated data structures) can be stored on a non-transitory computer-readable storage medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more devices presented herein, such as a network elements (e.g., routers or the like), network controllers (e.g., management systems or the like), or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, or the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to:
   receive a set of network configuration information for a network;
   reconstruct, based on the set of network configuration information for the network, a network intent for the network, wherein the network intent for the network is a network intent previously satisfied by the network, wherein the network intent has a network intent parameter associated therewith, wherein reconstruction of the network intent includes determining a potential value of the network intent parameter;
   determine, based on the set of network configuration information for the network, a network result for the network, wherein determination of the network result includes determining an actual value of the network intent parameter;
   determine, based on the potential value of the network intent parameter and the actual value of the network intent parameter, whether the network intent for the network is still satisfied by the network; and
   perform, based on whether the network intent for the network is still satisfied by the network, a management action.

2. The apparatus of claim 1, wherein the network configuration information for the network includes, for each network element in a set of network elements of the network, at least one of location information for the respective network element or capacity information for the respective network element.

3. The apparatus of claim 2, wherein, for at least one network element in the set of network elements, the capacity information for the respective network element includes, for each port in a set of ports of the respective network element, a port type of the respective port and a port speed of the respective port.

4. The apparatus of claim 1, wherein the network intent for the network and the network result for the network are based on at least one of a location parameter or a capacity parameter.

5. The apparatus of claim 1, wherein, to reconstruct the network intent for the network, the instructions, when executed by the at least one processor, cause the apparatus to:
   determine, based on the set of network configuration information, a network intent type of the network intent; and
   determine, based on the network intent type of the network intent, the network intent parameter for the network intent.

6. The apparatus of claim 1, wherein, to determine whether the network intent for the network is still satisfied by the network, the instructions, when executed by the at least one processor, cause the apparatus to:
   compare the potential value of the network intent parameter and the actual value of the network intent parameter.

7. The apparatus of claim 1, wherein the network intent for the network is reconstructed based on the network result for the network.

8. The apparatus of claim 1,
   wherein the network result for the network is determined based on the network intent for the network.

9. The apparatus of claim 1, wherein, to determine whether the network intent for the network is still satisfied by the network, the instructions, when executed by the at least one processor, cause the apparatus to:
  determine whether a difference between the potential value of the network intent parameter and the actual value of the network intent parameter satisfies a threshold.

10. The apparatus of claim 1, wherein the network intent parameter is a capacity parameter.

11. The apparatus of claim 1, wherein the management action includes at least one of providing a notification to a customer of the network or reconfiguring the network.

12. The apparatus of claim 1, wherein, based on a determination that the network intent for the network is still satisfied by the network, the management action includes providing a notification to a customer of the network.

13. The apparatus of claim 1, wherein, based on a determination that the network intent for the network is not still satisfied by the network, the management action includes reconfiguring the network.

14. The apparatus of claim 13, wherein the reconfiguring of the network is based on a difference between the potential value of the network intent parameter and the actual value of the network intent parameter.

15. A non-transitory computer-readable medium comprising computer program instructions which, when executed by an apparatus, cause the apparatus to:
  receive a set of network configuration information for a network;
  reconstruct, based on the set of network configuration information for the network, a network intent for the network, wherein the network intent for the network is a network intent previously satisfied by the network, wherein the network intent has a network intent parameter associated therewith, wherein reconstruction of the network intent includes determining a potential value of the network intent parameter;
  determine, based on the set of network configuration information for the network, a network result for the network, wherein determination of the network result includes determining an actual value of the network intent parameter;
  determine, based on the potential value of the network intent parameter and the actual value of the network intent parameter, whether the network intent for the network is still satisfied by the network; and
  perform, based on whether the network intent for the network is still satisfied by the network, a management action.

16. A method, comprising:
  receiving, by an apparatus, a set of network configuration information for a network;
  reconstructing, based on the set of network configuration information for the network, a network intent for the network, wherein the network intent for the network is a network intent previously satisfied by the network, wherein the network intent has a network intent parameter associated therewith, wherein reconstruction of the network intent includes determining a potential value of the network intent parameter;
  determining, based on the set of network configuration information for the network, a network result for the network, wherein determination of the network result includes determining an actual value of the network intent parameter;
  determining, based on the potential value of the network intent parameter and the actual value of the network intent parameter, whether the network intent for the network is still satisfied by the network; and
  performing, based on whether the network intent for the network is still satisfied by the network, a management action.

* * * * *